United States Patent [19]

Nakamura et al.

[11] 4,348,618
[45] Sep. 7, 1982

[54] FEEDING SYSTEM FOR LINEAR MOTOR TYPE TRANSPORTING SYSTEM

[75] Inventors: Kiyoshi Nakamura, Katsuta; Masayoshi Isaka, Hitachi, both of Japan

[73] Assignee: Hitachi, Ltd., Tokyo, Japan

[21] Appl. No.: 132,641

[22] Filed: Mar. 21, 1980

[30] Foreign Application Priority Data

Mar. 28, 1979 [JP] Japan .................................. 54-36692

[51] Int. Cl.$^3$ ...................... H02K 41/03; B60L 15/22
[52] U.S. Cl. ...................................... 318/38; 104/290; 104/292; 104/295; 104/298; 246/5; 246/187 B; 318/135
[58] Field of Search ............... 104/290, 292, 295, 298, 104/299, 301; 246/187 B, 187 C, 5; 318/38, 135, 687

[56] References Cited

U.S. PATENT DOCUMENTS

| | | | |
|---|---|---|---|
| 3,721,874 | 3/1973 | Pelenc et al. | 318/135 |
| 3,803,466 | 4/1974 | Starkey | 104/298 X |
| 3,904,941 | 9/1975 | Matsui et al. | 318/135 |
| 3,967,801 | 7/1976 | Baughman | 246/187 B X |
| 4,068,152 | 1/1978 | Nakamura et al. | 104/298 X |

*Primary Examiner*—Randolph A. Reese

*Attorney, Agent, or Firm*—Craig and Antonelli

[57] ABSTRACT

A feeding system for a linear motor transportation system in which a number of discrete drive coil units or linear motor units are arranged along a track to generate a moving magnetic field for driving trains is disclosed. In the present feeding system, a number of feeding sections extend contiguously along the track and each of the feeding sections includes at least one power supply station. Each feeding section is divided into at least two linear motor blocks each having a feeder block. The linear motor units in each of the linear motor blocks are connected through associated ones of a first group of switches to the associated feeder means which are connected to the power converter of the associated feeding section through associated ones of a second group of switches. Preferably, those adjacent two feeder blocks which belong to adjacent different feeding sections respectively are coupled together through an associated one of a third group of switches. Preferably, the second switches are correspondingly connected to the power supply stations through a fourth group of switches. Preferably, in each of the feeding sections, a dynamic brake is coupled to the junction of the second switches and the feeder blocks or the junction of the second and fourth switches through a corresponding one of a fifth group of switches.

32 Claims, 34 Drawing Figures

FIG. 2B

| FEEDING SECTION | n-2 | n-1 | | n | | n+1 | | n+2 |
|---|---|---|---|---|---|---|---|---|
| LINEAR MOTOR BLOCK | $LM_{n-2 \cdot f}$ | $LM_{n-1 \cdot b}$ | $LM_{n-1 \cdot f}$ | $LM_{n \cdot b}$ | $LM_{n \cdot f}$ | $LM_{n+1 \cdot b}$ | $LM_{n+1 \cdot f}$ | $LM_{n+2 \cdot b}$ |
| CASE 1 | | | ▷ | | | | ▷ | |
| CASE 2 | | | | ▷ | | | ▷ | |
| CASE 3 | ▷ | | | | ▷ | | | ▷ |
| CASE 4 | ▷ | | | | ▷ | | | ▷ |
| CASE 5 | | | ▷ | | | ▷ | | |

FIG. 2C

| FEEDING SECTION | n-2 | n-1 | | | n | | | n+1 | | | n+2 |
|---|---|---|---|---|---|---|---|---|---|---|---|
| SWITCH | $SW2_{n-2 \cdot f}$ | $SW3_{n-2 \cdot n-1}$ | $SW2_{n-1 \cdot b}$ | $SW2_{n-1 \cdot f}$ | $SW3_{n-1 \cdot n}$ | $SW2_{n \cdot b}$ | $SW2_{n \cdot f}$ | $SW3_{n \cdot n+1}$ | $SW2_{n+1 \cdot b}$ | $SW2_{n+1 \cdot f}$ | $SW3_{n+1 \cdot n+2}$ | $SW2_{n+2 \cdot b}$ |
| CASE 1 | ○ | × | ○ | ② | × | ○ | ○ | × | ○ | ① | × | ○ |
| CASE 2 | ○ | × | ○ | ② | × | ② | ○ | × | ○ | ① | × | ○ |
| CASE 3 | ③ | × | ○ | ○ | × | ② | ○ | × | × | × | × | ① |
| CASE 4 | ③ | × | ○ | ○ | × | ② | ② | × | ○ | ○ | × | ① |
| CASE 5 | ○ | × | ○ | ③ | × | ○ | ○ | × | ② | ○ | × | ○ |

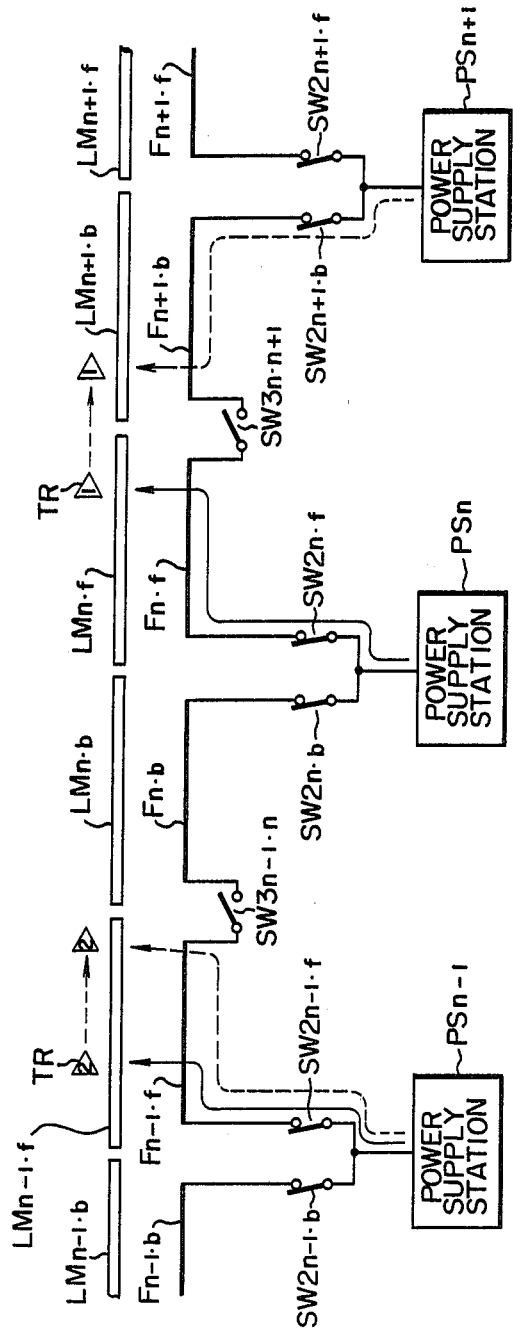

FIG. 3B

| FEEDING SECTION | n-2 | n-1 | | n | | n+1 | | n+2 |
|---|---|---|---|---|---|---|---|---|
| LINEAR MOTOR BLOCK | LMn-2·f | LMn-1·b | LMn-1·f | LMn·b | LMn·f | LMn+1·b | LMn+1·f | LMn+2·b |
| CASE 1 | ▷ | | ▷ | | ▷ | | | ▷ |
| CASE 2 | ▷ | | ▷ | | ▷ | | | ▷ |
| CASE 3 | ▷ | | ▷ | | | ▷ | | ▷ |
| CASE 4 | | ▷ | | ▷ | | ▷ | | |

FIG. 3C

| FEEDING SECTION | n-2 | n-1 | | | n | | | n+1 | | | n+2 |
|---|---|---|---|---|---|---|---|---|---|---|---|
| SWITCH | SW2n-2·f | SW3n-2·n-1 | SW2n-1·b | SW2n-1·f | SW3n-1·n | SW2n·b | SW2n·f | SW3n·n+1 | SW2n+1·b | SW2n+1·f | SW3n+1·n+2 | SW2n+2·b |
| CASE 1 | ④ | × | ○ | ③ | × | ○ | ② | × | ○ | ○ | × | ① |
| CASE 2 | ④ | × | ○ | ③ | × | ○ | ② | × | ○ | ○ | × | ① |
| CASE 3 | ④ | × | ○ | ③ | × | ○ | ○ | × | ② | ○ | × | ① |
| CASE 4 | ④ | × | ④ | ○ | × | ③ | ○ | × | ② | ○ | × | ○ |

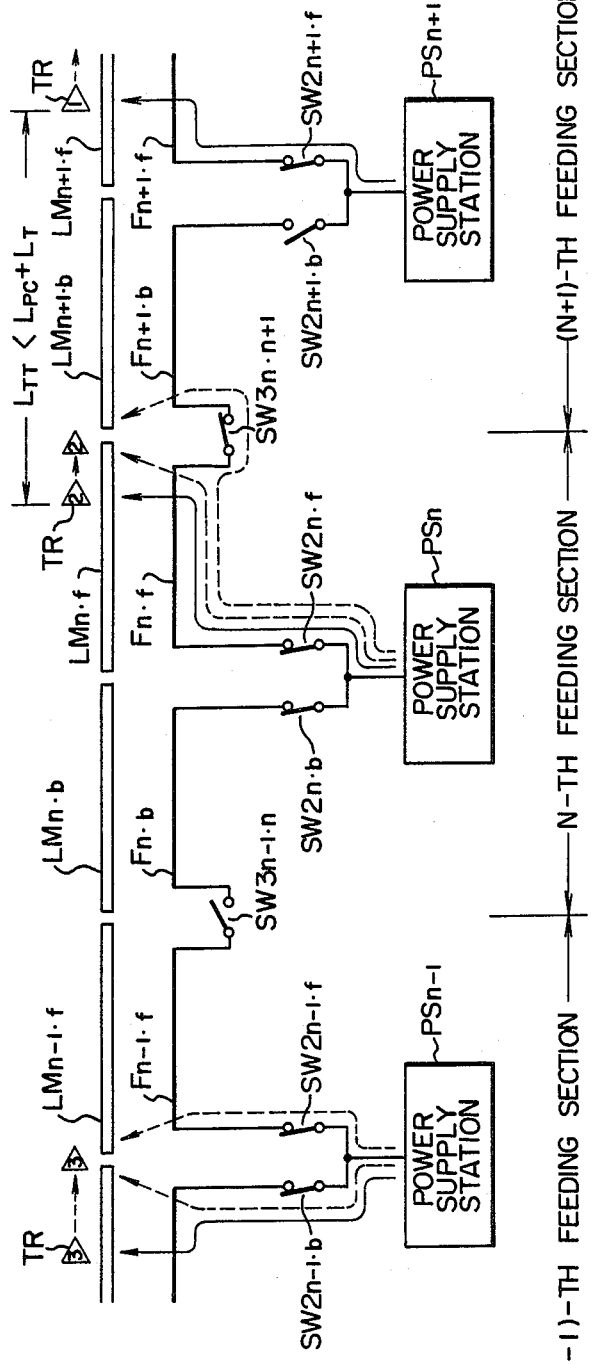

FIG. 6B

| FEEDING SECTION | n-2 | n-1 | | n | | n+1 | | n+2 |
|---|---|---|---|---|---|---|---|---|
| LINEAR MOTOR BLOCK | $LM_{n-2 \cdot f}$ | $LM_{n-1 \cdot b}$ | $LM_{n-1 \cdot f}$ | $LM_{n \cdot b}$ | $LM_{n \cdot f}$ | $LM_{n+1 \cdot b}$ | $LM_{n+1 \cdot f}$ | $LM_{n+2 \cdot b}$ |
| CASE 1 | | ▷ | | | ▷ | | ▷ | |
| CASE 2 | | | ▷ | | | ▷ | | ▷ |
| CASE 3 | ▷ | | ▷ | | ▷ | | | ▷ |
| CASE 4 | ▷ | | ▷ | | | ▷ | | ▷ |
| CASE 5 | ▷ | | | ▷ | | ▷ | | ▷ |

FIG. 6C

| FEEDING SECTION | n-2 | n-1 | | | n | | | n+1 | | | n+2 |
|---|---|---|---|---|---|---|---|---|---|---|---|
| SWITCH | $SW2_{n-2 \cdot f}$ | $SW3_{n-2 \cdot n-1}$ | $SW2_{n-1 \cdot b}$ | $SW2_{n-1 \cdot f}$ | $SW3_{n-1 \cdot n}$ | $SW2_{n \cdot b}$ | $SW2_{n \cdot f}$ | $SW3_{n \cdot n+1}$ | $SW2_{n+1 \cdot b}$ | $SW2_{n+1 \cdot f}$ | $SW3_{n+1 \cdot n+2}$ | $SW2_{n+2 \cdot b}$ |
| CASE 1 | ○ | × | ③ | ○ | × | ○ | ② | ○ | × | ① | × | ○ |
| CASE 2 | ○ | × | ③ | ③ | × | ○ | ② | ② | × | ① | × | ○ |
| CASE 3 | ④ | × | ○ | ③ | × | ○ | ② | × | ② | ○ | × | ① |
| CASE 4 | ④ | × | ○ | ③ | × | ○ | ○ | × | ② | ○ | × | ① |
| CASE 5 | ④ | × | ○ | ③ | × | ③ | ○ | × | ② | ○ | × | ① |

FIG. 9B

| FEEDING SECTION | n-2 | n-1 | | n | | n+1 | | n+2 |
|---|---|---|---|---|---|---|---|---|
| LINEAR MOTOR BLOCK | LMn-2·f | LMn-1·b | LMn-1·f | LMn·b | LMn·f | LMn+1·b | LMn+1·f | LMn+2·b |
| CASE 1 | | | ▷ | | | | ▷ | |
| CASE 2 | ▷ | | | ▷ | | | | ▷ |
| CASE 3 | ▷ | | | ▷ | | | | ▷ |
| CASE 4 | | ▷ | | | ▷ | | | ▷ |
| CASE 5 | | | ▷ | | | ▷ | | |

FIG. 9C

| FEEDING SECTION | n-2 | n-1 | | | n | | n+1 | | | n+2 |
|---|---|---|---|---|---|---|---|---|---|---|
| SWITCH | SW2n-2·f | SW3n-2·n-1 | SW2n-1·b | SW2n-1·f | SW3n-1·n | SW2n·b | SW2n·f | SW3n·n+1 | SW2n+1·b | SW2n+1·f | SW3n+1·n+2 | SW2n+2·b |
| CASE 1 | ○ | × | ○ | ② | ○ | × | × | × | × | ① | × | ○ |
| CASE 2 | ③ | × | × | ② | ② | × | × | ○ | ○ | ○ | × | ① |
| CASE 3 | ③ | × | × | ② | ② | × | × | ② | ② | ○ | × | ① |
| CASE 4 | ③ | × | ○ | ○ | ○ | × | × | ② | ② | ○ | × | ① |
| CASE 5 | ○ | × | ③ | ○ | ○ | × | × | ○ | ② | ○ | × | ○ |

FIG. 10B

| FEEDING SECTION | n-2 | n-1 | | n | | n+1 | | n+2 |
|---|---|---|---|---|---|---|---|---|
| LINEAR MOTOR BLOCK | LMn-2·f | LMn-1·b | LMn-1·f | LMn·b | LMn·f | LMn+1·b | LMn+1·f | LMn+2·b |
| CASE 1 | | ▷ | | ▷ | | | ▷ | |
| CASE 2 | | ▷ | | | ▷ | | ▷ | |
| CASE 3 | | | ▷ | | ▷ | | | ▷ |
| CASE 4 | | | ▷ | | ▷ | | ▷ | |
| CASE 5 | | ▷ | | ▷ | | ▷ | | |

FIG. 10C

| FEEDING SECTION | n-2 | n-1 | | | n | | | n+1 | | | n+2 |
|---|---|---|---|---|---|---|---|---|---|---|---|
| SWITCH | SW2n-2·f | SW3n-2·n-1 | SW2n-1·b | SW2n-1·f | SW3n-1·n | SW2n·b | SW2n·f | SW3n·n+1 | SW2n+1·b | SW2n+1·f | SW3n+1·n+2 | SW2n+2·b |
| CASE 1 | ○ | × | × | ② | ② | × | × | × | × | ① | × | ○ |
| CASE 2 | ○ | × | ③ | ○ | ○ | × | × | × | × | ① | × | ○ |
| CASE 3 | ○ | × | ○ | ③ | ○ | × | × | × | × | ① | × | ① |
| CASE 4 | ④ | × | ○ | ③ | ○ | × | × | ② | ② | ○ | × | ① |
| CASE 5 | ○ | × | × | ③ | ③ | × | × | ○ | ② | ○ | × | ○ |

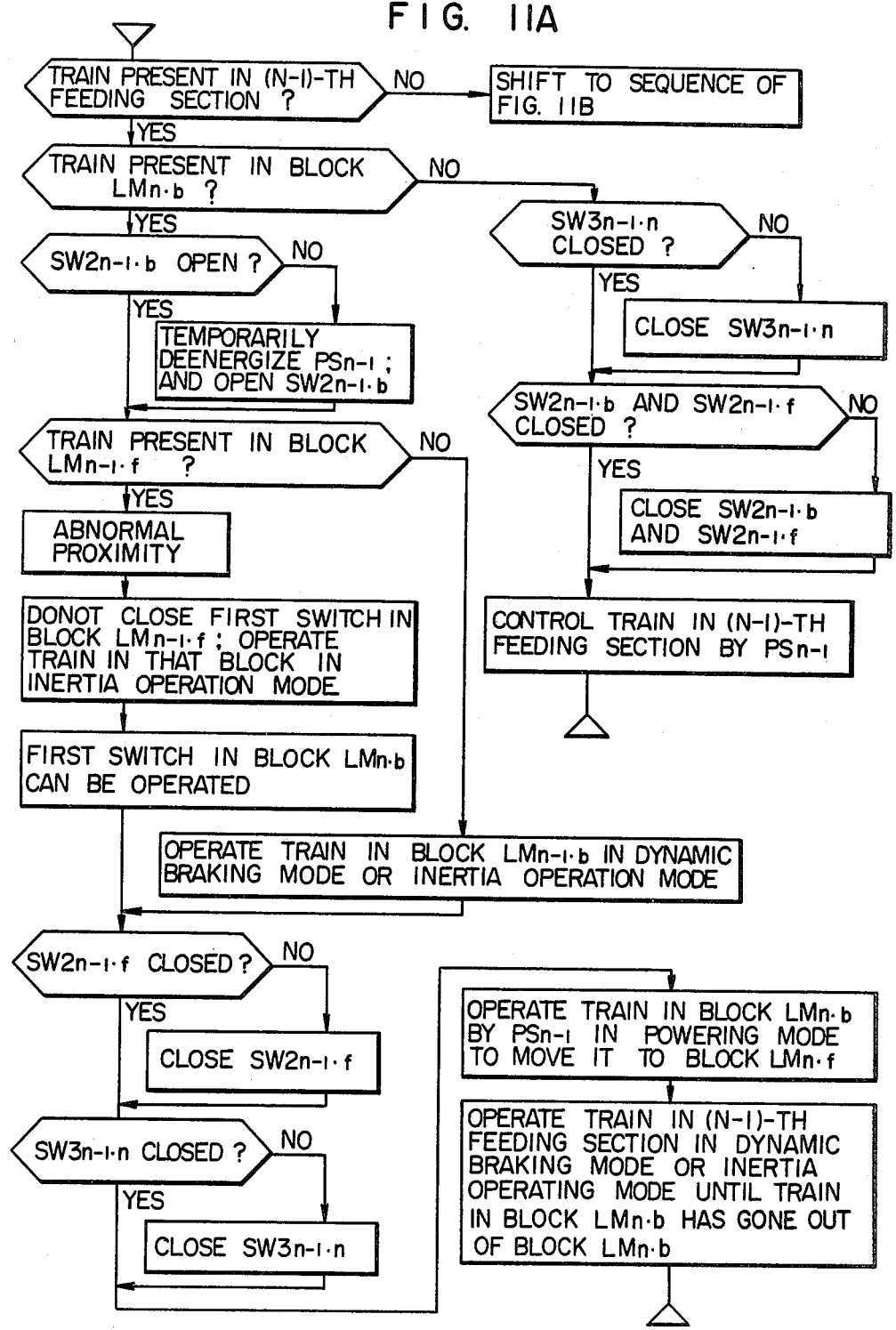
FIG. IIA

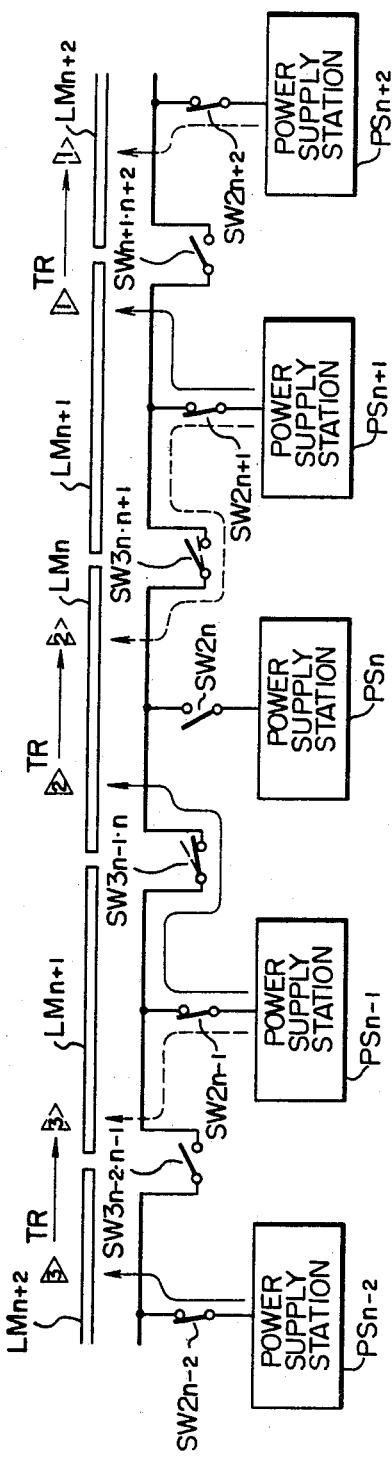
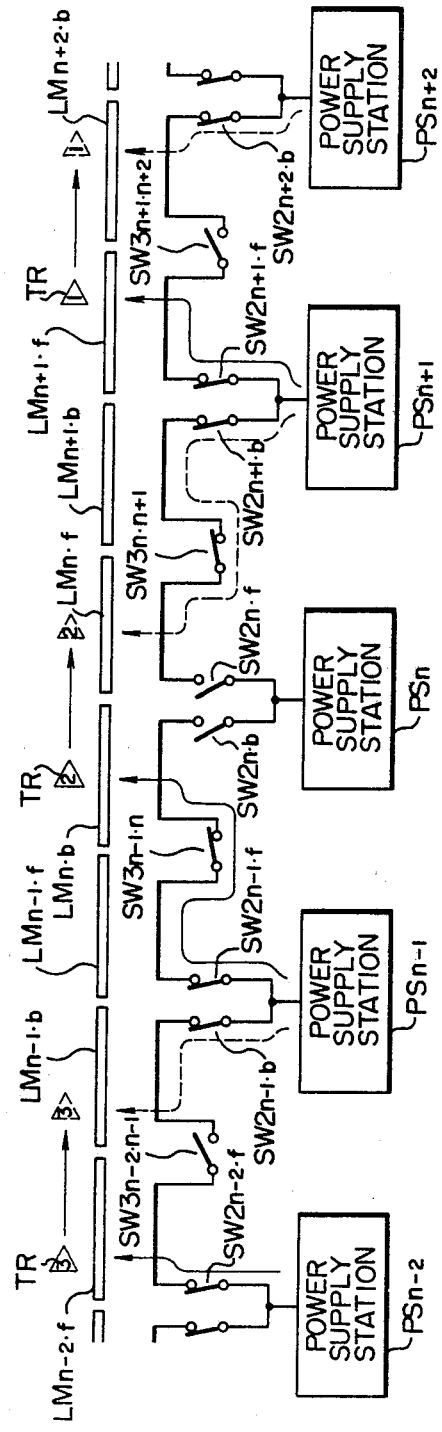
F I G. 14A
F I G. 14B

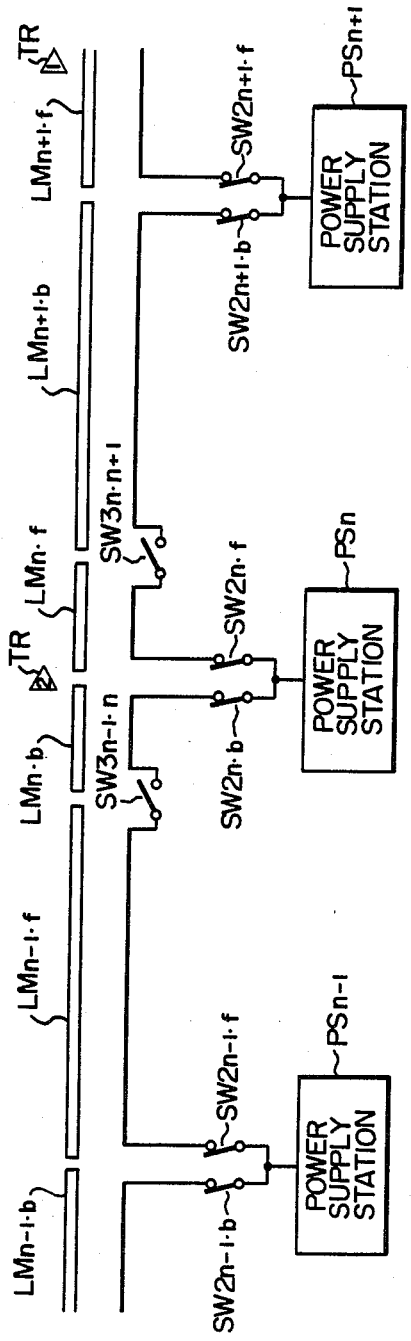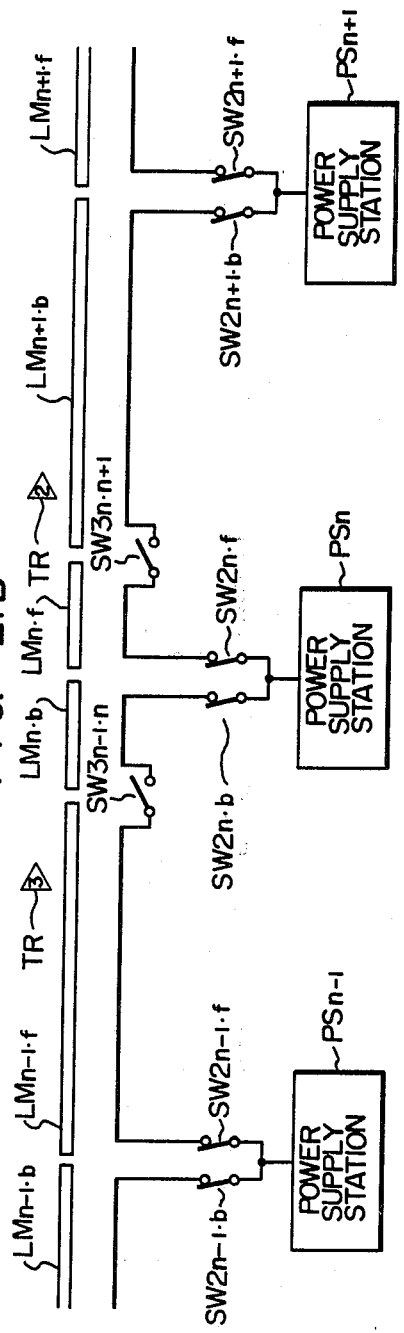
FIG. 21A
FIG. 21B

FEEDING SYSTEM FOR LINEAR MOTOR TYPE TRANSPORTING SYSTEM

The present invention relates to a feeding system for a linear motor (e.g. linear synchronous motor, linear induction motor or D.C. linear motor) mounted continuously on the ground in an ultra high speed transportation system.

Various methods are known to efficiently feed the linear motor mounted continuously on the ground. One of the excellent methods in the prior art is disclosed in Japanese Pat. No. 53-4201 (counterparts of which are U.S. Pat. No. 4,068,152 and German DAS 2,310,812). In that patent, a drive coil of a linear motor system is arranged along a long transport path. The drive coil is divided into a number of drive coil units (hereinafter refered to as linear motor units) each having a length longer than the length of a train. The transport path is divided into a number of feeding sections each including a plurality of ones of said linear motor units and one linear motor feeding device. Each of the linear motor units in each feeding section is energized from a power converter of the linear motor feeding device for that feeding section through feeder means and an electric switch device. As the feeder means a plurality of feeders, for example a pair of feeders, are used, which are connected to a pair of power converters (e.g. cycoconverters or inverters) in the linear motor feeding device. The linear motor units are connected alternately to one and the other of the pair of feeders through the switch devices so that a driving force for the train does not vary. It should be noted that only one train can be present in one feeding section as will be readily understood. If a train is present in a fedding section when another train moves into that feeding section, two trains of different velocities are to be operated by one linear motor feeding device. If a synchronous linear motor is used, this causes desynchronization or pulsation of driving force. Accordingly, such an operation is not permitted. Therefore, it is not permitted that a train be present in a feeding section forward or backward of a feeding section in which another train is present. In addition, when a so-called block section is provided as is usual in a conventional railway train operation control system from a standpoint of safety in operating a plurality of trains, it is necessary to assure that a train is not present in the feeding section forward or backward of a feeding section in which another train is present.

As described above, in the feeding system for the linear motor in accordance with the prior art explained above, only five trains can run in ten feeding sections, for example. This, the density of trains in operations is limited. In this system, the length of the feeding section must be shortened in order to increase the density of trains in operation. This causes the increase of the number of power converters. In either case, a utilization factor of the power converter is low. In addition, if a power converter in any one of the feeding section is down, the train cannot run in that feeding section and the operation of the trains in the transport path is hindered. This causes a problem in reliability.

Accordingly, it is an object of the present invention to overcome the difficulties mentioned above and provide a feeding system for a linear motor transportation system which can increase the density of trains in operation and has a high utilization factor of the power converters.

In order to accomplish the above object of the present invention, the present invention provides a feeding system for a linear motor transportation system in which a plurality of divided drive coil units or linear motor units are arranged along a track to generate a moving magnetic field for driving vehicles, which feeding system comprises; a plurality of feeding sections continuously extending along the track, the plurality of linear motor units being allotted to the feeding sections; at least one power converter arranged in each one of the feeding sections; each one of the feeding sections being subdivided into at least two linear motor blocks; two feeder means arranged in the two linear motor blocks in each of the feeding sections; a first set of switching means, the linear motor units belonging to one of the two linear motor blocks of each of the feeding sections being connected to one of the two feeder means through corresponding ones of the first set of switching means while the linear motor units belonging to the other of the linear motor blocks being connected to the other of the feeder means through corresponding ones of the first set of switching means; and a second set of switching means, the two feeder means arranged in each of the respective feeding sections being connected to the feeding device through corresponding ones of the second set of switching means.

Preferably, the feeding system further comprises a third set of switching means, adjacent two of the feeder means respectively belonging to two adjacent different feeding sections being interconnected through corresponding ones of the third set of switching means.

Preferably, the feeding system further comprises a fourth set of switching means, each of the second set of switching means being connected to the associated power converter through corresponding one of the fourth set of switching means.

Preferably, the feeding system further comprises a fifth set of switching means and a plurality of dynamic braking means each connected to at the junction portion between corresponding one of the second set of switching means and the feeder means connected thereto, or when the fourth set of switching means are provided at the junction portion between each one of the fourth set of switching group and the second set of switching means connected thereto, through corresponding one of the fifth set of switching means.

Preferred embodiments of the present invention will be explained in detail with reference to the accompanying drawings, in which;

FIGS. 2A to 2C illustrate operation of the feeding system of the present invention when an interval between trains satisfies formula (1), in particular FIG. 2A showing a simplified circuit diagram, FIG. 2B showing a map illustrating train positions, and FIG. 2C showing an operation map for switches;

FIGS. 3A to 3C illustrate operation of the feeding system when the interval between trains satisfies formula (2);

FIGS. 6A to 6C illustrate operation when the interval between trains becomes short;

Figure 5:
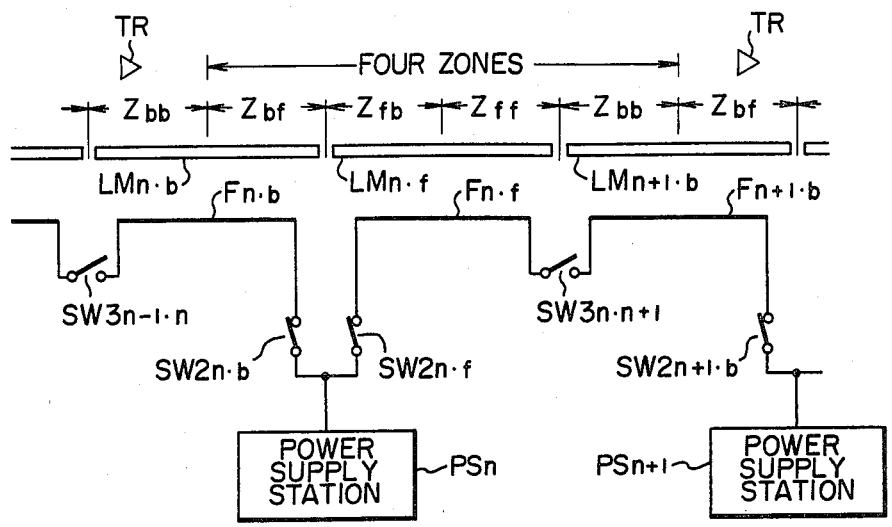
FIG. 5 shows detection zones for the train.
Figure 8:
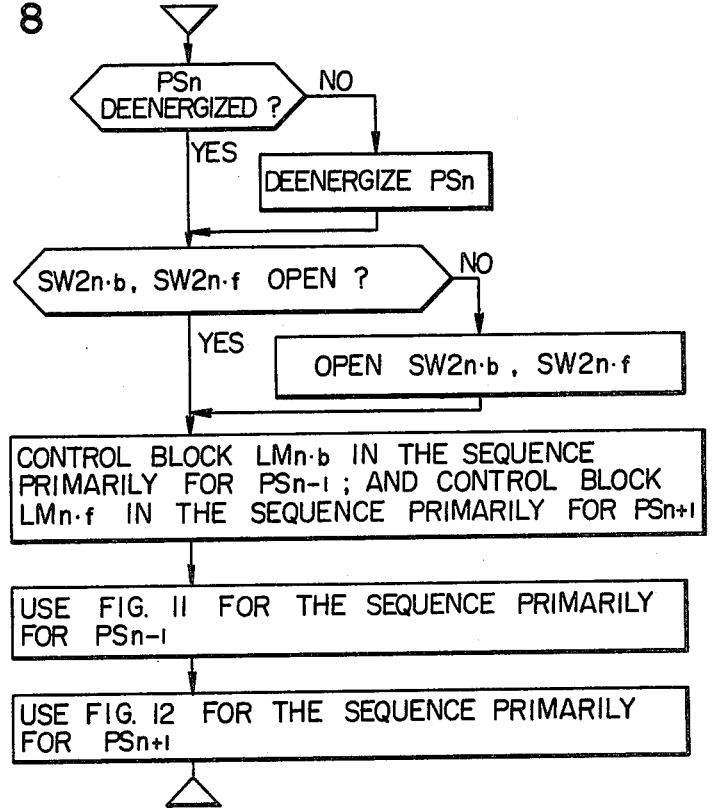
Figure 11B:
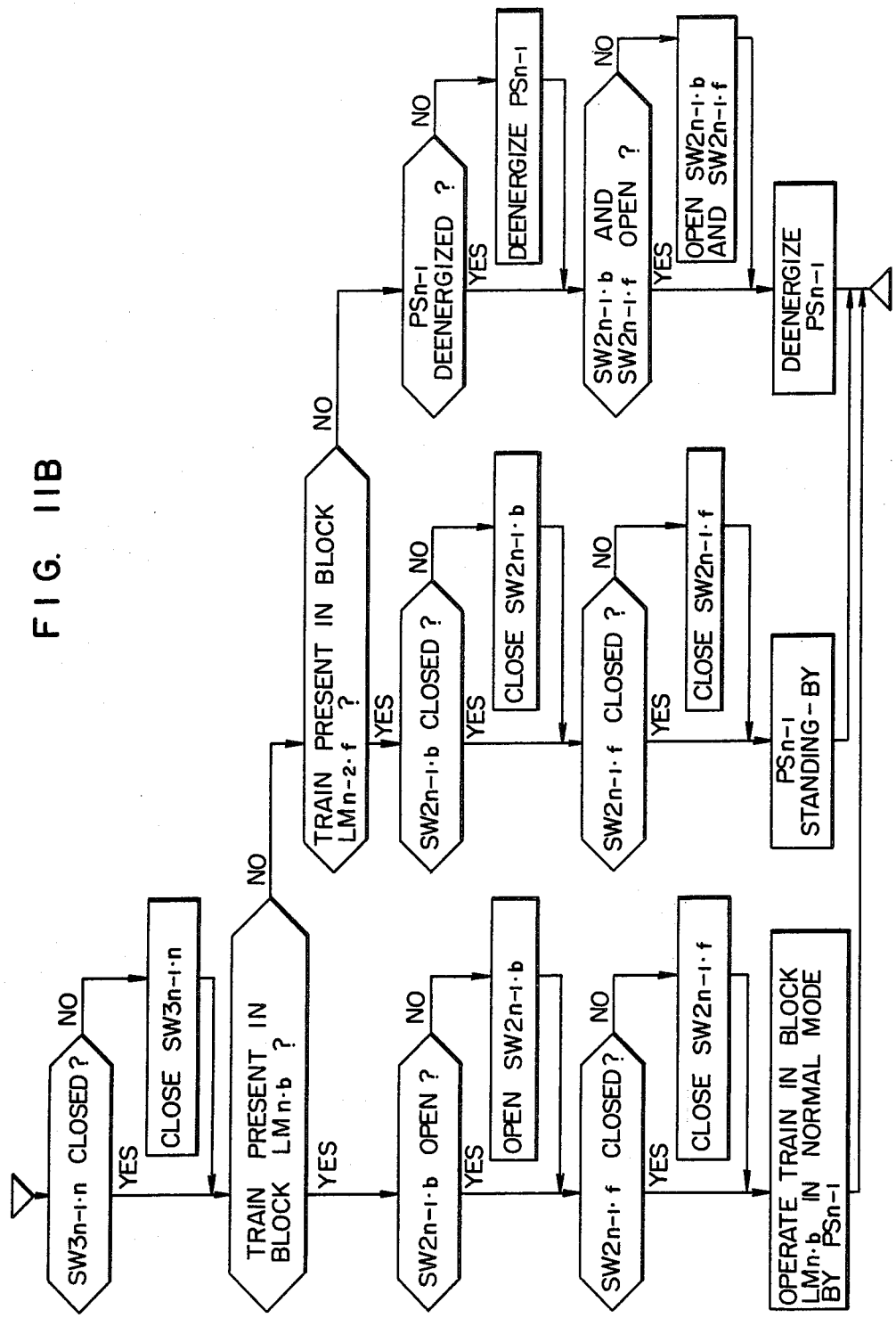
Figure 12:
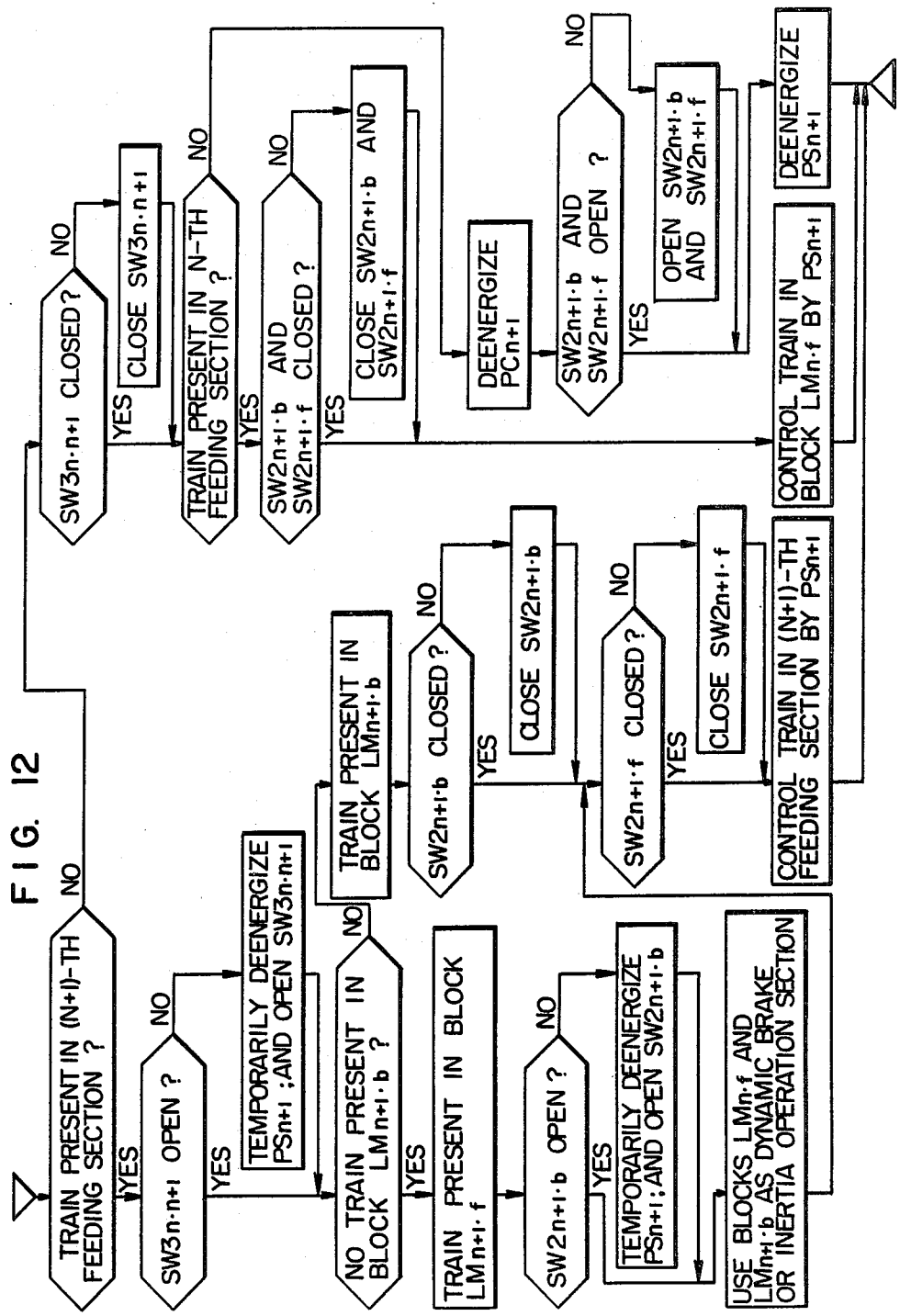
Figure 13:
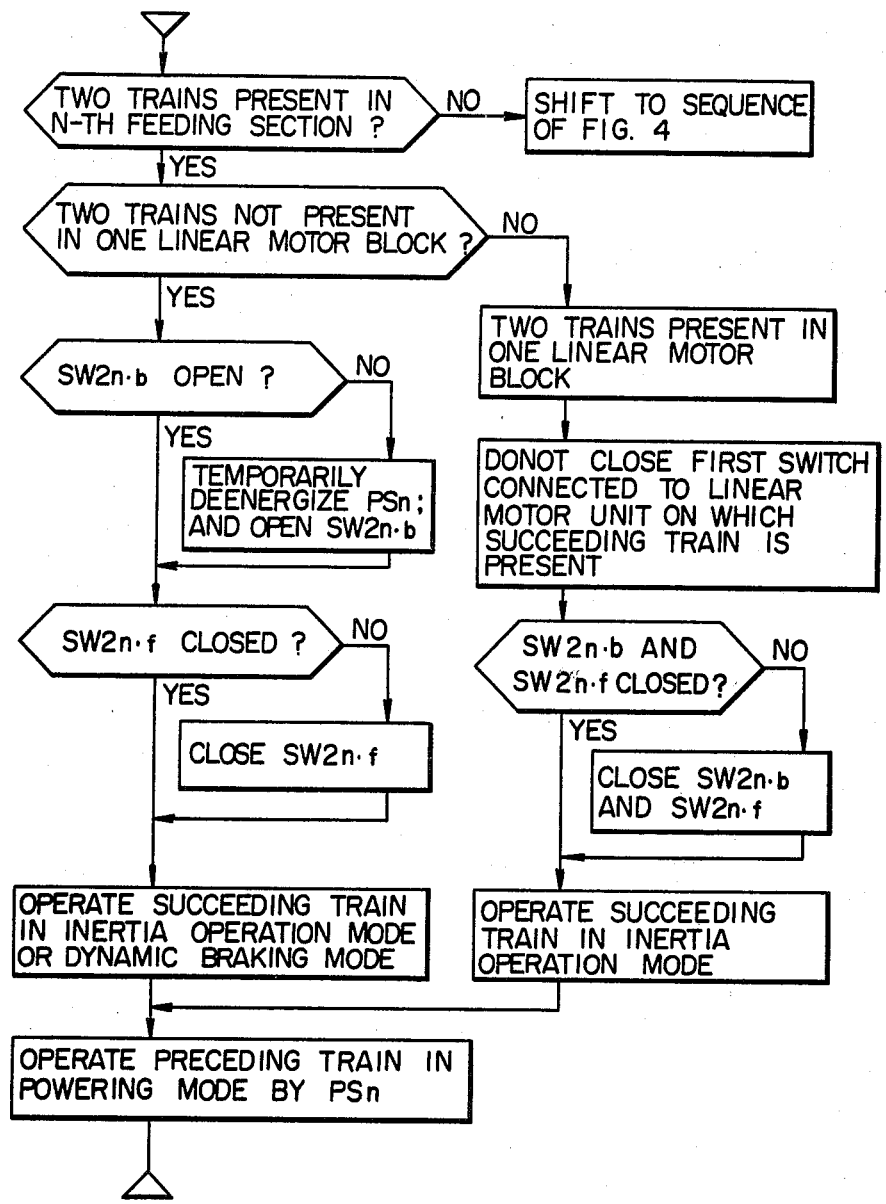
Figure 15:
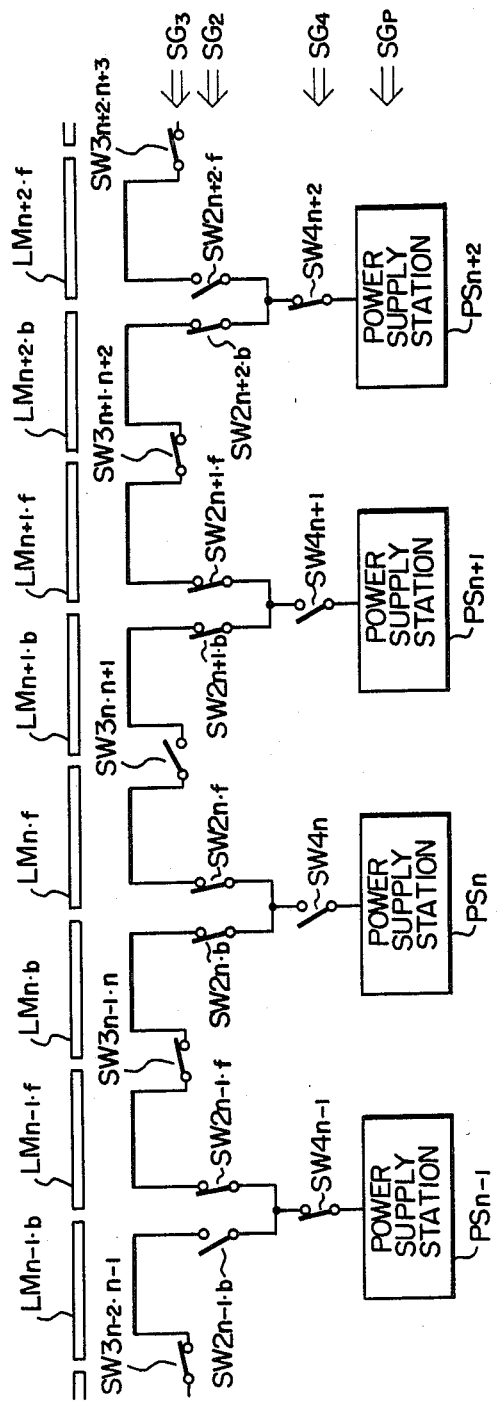
Figure 16:
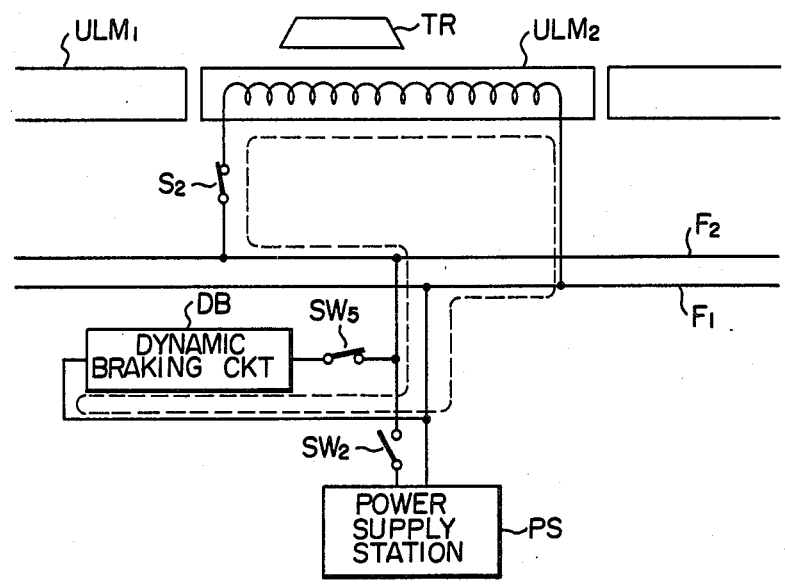
Figure 17:
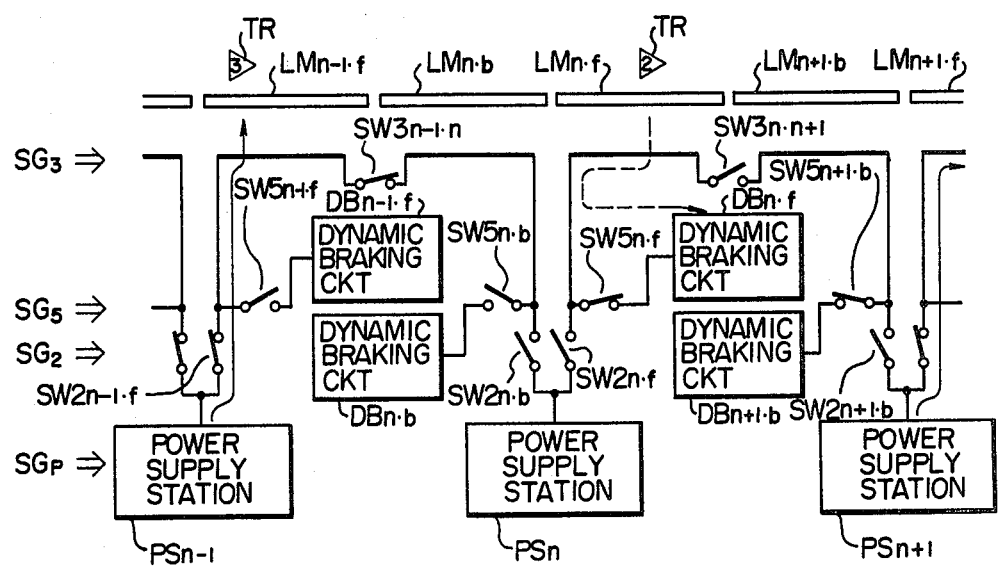
Figure 18:
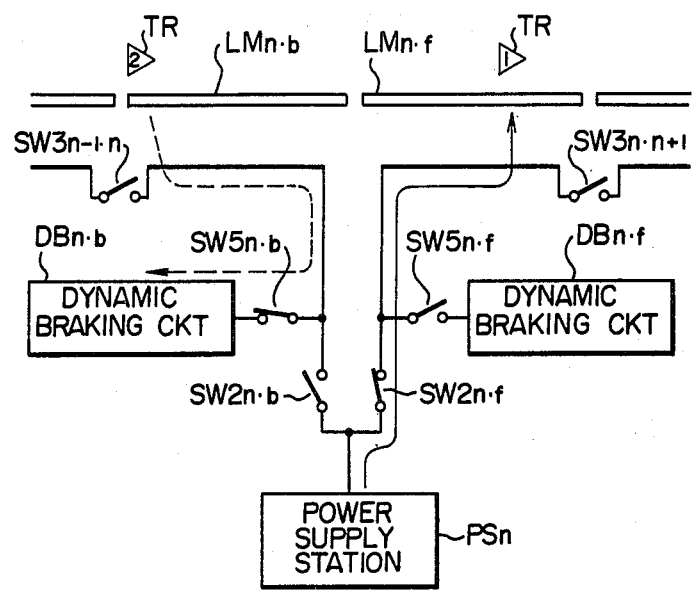
Figure 19:
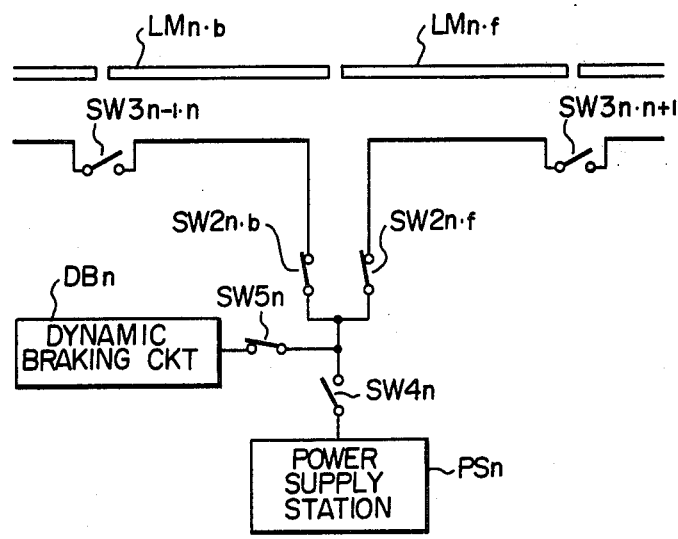
Figure 20:
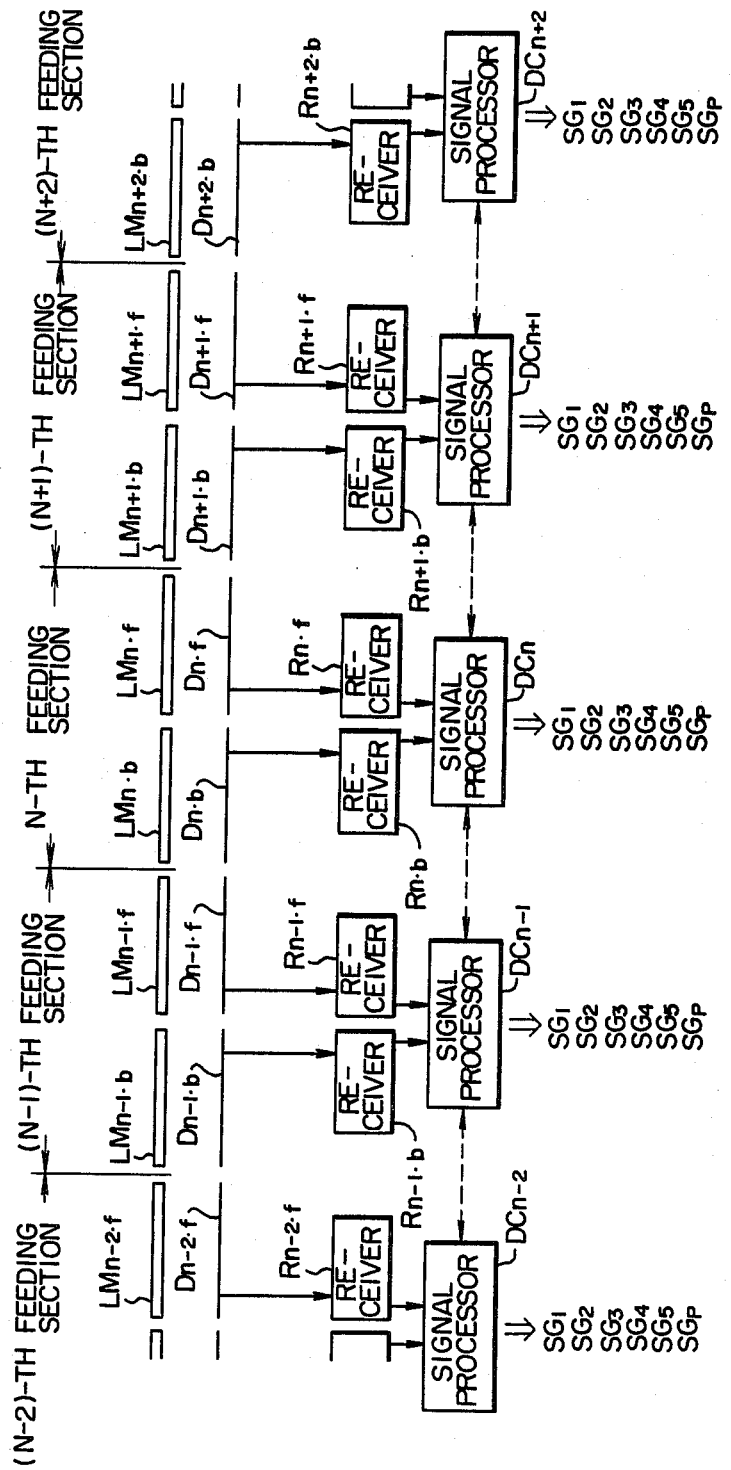

FIG. 8 drawn in the same sheet in which FIG. 5 is drawn is a flow chart showing a handling sequence when a power converter of a power supply station is down;

FIGS. 9A to 9C and 10A to 10C illustrate operations when the interval between trains satisfies the formulas (1) and (2), respectively;

FIGS. 11A and 11B are flow charts showing basic handling sequences around the (n−1)-th feeding section when the n-th feeding section is down;

FIG. 12 is a flow chart showing a basic handling sequence around (n+1)-th feeding section when n-th feeding section is down;

FIG. 13 is a flow chart showing a basic handling sequence when two trains are present in one feeding section;

FIGS. 14A and 14B illustrate operational features when a power converter of a power supply station is down for different ways of arrangement of linear motor blocks in one feeding section;

FIG. 15 shows a schematic diagram of the feeding system when power converters of two adjacent power supply stations are simultaneously down;

FIG. 16 illustrates a dynamic braking circuit;

FIG. 17 illustrates a dynamic braking operation in accordance with the present invention;

FIG. 18 illustrates an operation when two vehicles are present in one feeding sections;

FIG. 19 shows another embodiment of the dynamic braking circuit of the present invention;

FIG. 20 shows a block diagram illustrating a construction of a train position detecting system;

FIGS. 21A and 21B is a simplified circuit diagram showing a construction of the feeding system of the present invention around a railway station.

Figure 1:
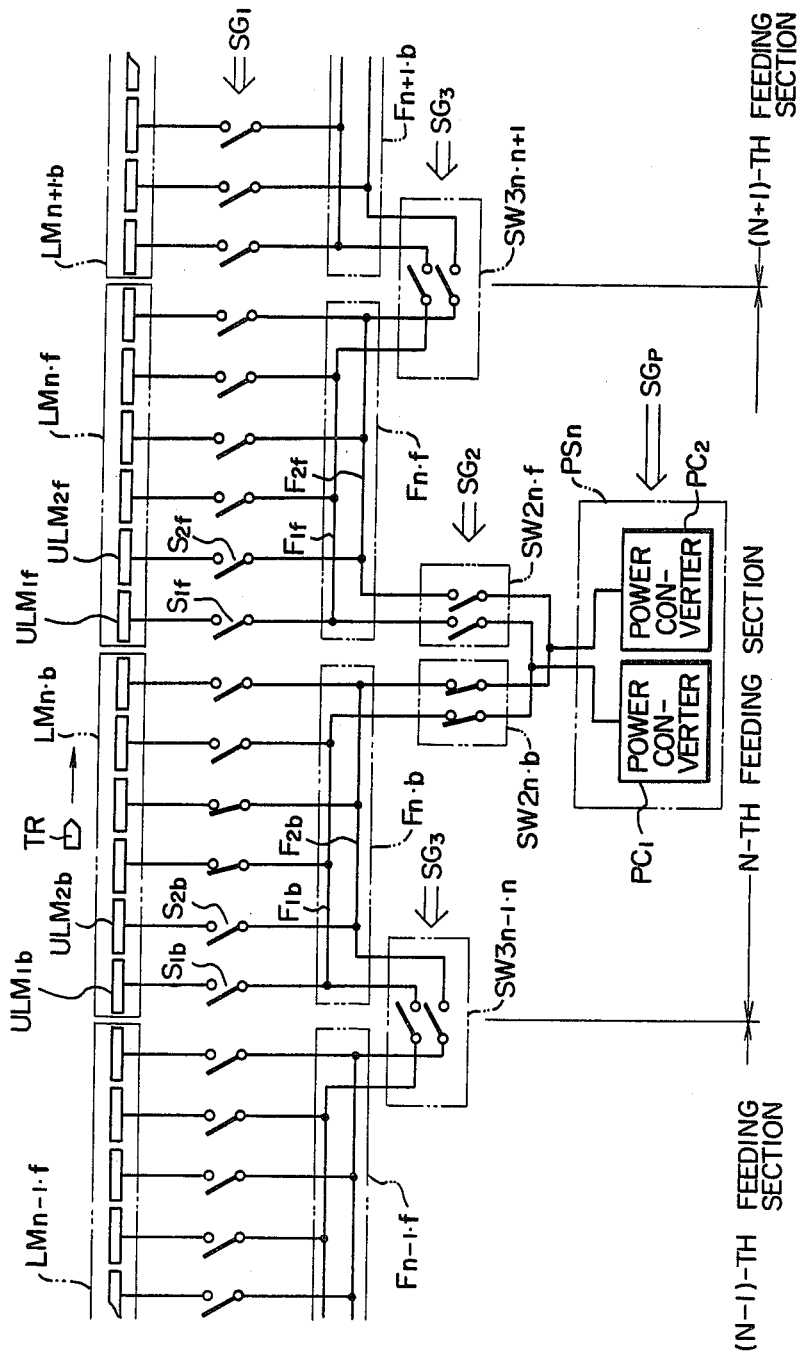
FIG. 1 shows a schematic diagram of one embodiment of the feeding system of the present invention.

In a preferred embodiment of the present invention shown in FIG. 1, a transport path is divided into a plurality of feeding sections in each of which a plurality of linear motor units are arranged along the transport path, as in prior art systems. FIG. 1 shows an n-th feeding section, and (n−1)-th and (n+1)-th feeding sections adjacent thereto are shown partially. It differs from the prior art system described above in that the linear motor units in each feeding system are grouped into two block sections, a forward linear motor block and a backward linear motor block. That is, the linear motor units in the n-th feeding section are grouped into a forward linear motor block $LM_{n-f}$ and a backward linear motor block $LM_{n-b}$, which are fed by forward feeder means $F_{n-f}$ and backward feeder means $F_{n-b}$, respectively. The forward feeder means $F_{n-f}$ preferably comprises a pair of feeders $F_{1f}$ and $F_{2f}$ while the backward feeder means $F_{n-b}$ preferably comprises a pair of feeders $F_{1b}$ and $F_{2b}$. Linear motor units $ULM_{1f}$, $ULM_{2f}$, . . . belonging to the forward linear motor block $LM_{n-f}$ are alternately connected to the feeders $F_{1f}$ and $F_{2f}$ through first switches $S_{1f}$, $S_{2f}$, . . . , respectively, while linear motor units $ULM_{1b}$, $ULM_{2b}$, . . . belonging to the backward linear motor block $LM_{n-b}$ are connected to the feeders $F_{1b}$, $F_{2b}$, . . . through the first switches $S_{1b}$, $S_{2b}$, . . . , respectively. The forward and backward feeder means $F_{n-f}$ and $F_{n-b}$ are connected to a power supply station $PS_n$ through second switches $SW2_{n-f}$ and $SW2_{n-b}$, respectively, and fed therefrom. More particularly, the power supply station $PS_n$ preferably includes a pair of power converters $PC_1$ and $PC_2$ and the second switches $SW2_{n-f}$ and $SW2_{n-b}$ are double-pole switches respectively. The power converter $PC_1$ is connected to the feeders $F_{1f}$ and $F_{1b}$ through first paths of the second switches $SW2_{n-f}$ and $SW2_{n-b}$, respectively, while the power converter $PC_2$ is connected to the feeders $F_{2f}$ and $F_{2b}$ through second paths of the second switches $SW2_{n-f}$ and $SW2_{n-b}$, respectively. In this manner, in each feeding section, the linear motor units $ULM_{1f}$, $ULM_{2f}$. . . ; and $ULM_{1b}$, $ULM_{2b}$, . . . are alternately and sequentially energized by the power converters $PC_1$ and $PC_2$. The present embodiment further differs from the prior art system described above in that those feeder means in (n−1)-th and (n+1)-th feeding sections which are respectively adjacent to the two feeder means in the n-th feeding section are preferably connected to each other through third switches. More particularly, as shown in FIG. 1, the forward feeder means $F_{n-f}$ in the n-th feeding section is connected to the backward feeder means $F_{n+1-b}$ in the forwardly adjacent (n+1)-th feeding section through the third switch $SW3_{n-n+1}$, and the backward feeder means $F_{n-b}$ is connected to the forward feeder means $F_{n-1-f}$ in the backwardly adjacent (n−1)-th feeding section through the third switch $SW3_{n-1-n}$. The third switches are also of double-pole to connect the feeder $F_{1f}$ to the feeder $F_{1b}$, and the feeder $F_{2f}$ to the feeder $F_{2b}$, of the two adjacent feeder means. A basic operation of the first switches is to close associated switches in response to position information as the trains TR move to energize the linear motor units connected to those switches. The switching operation of the first switches is controlled by a signal $SG_1$ from a signal processing unit which will be described later in connection with FIG. 20. The operation of the first switches has been known in the prior art and hence the explanation thereof is omitted in the following description except when they are operated in a special way. While the embodiment of FIG. 1 shows two feeders for each feeder means and hence two power converters for each power supply station to follow the prior art system described above, the number of the feeders of each feeder means and hence the number of the power converters in each power supply station need not be two but they may be only one in order to accomplish the object of the present invention. However, from a standpoint of enhancement of confortable feeling of riding, the number of the feeders of each feeder means may preferably be increased to such as three or more. In such a case, the number of the power converters in each power supply station and the number of poles of the respective second switches are increased corresponding to the number of the feeders. Further, while two linear motor blocks are shown in each feeding section, each feeding section may be grouped into three or more linear motor blocks. In such a case, the number of the feeder means and the number of the second switches are increased correspondingly. Therefore, it should be understood that FIG. 1 shows a mere example of the preferred embodiments.

Referring to a simplified circuit diagram of a feeding system corresponding to FIG. 1, operation thereof will be explained. Let us assume a normal operation condition in which any power supply station in one feeding section and an adjacent feeding section is not down. Explanation will be made for the cases where the interval between adjacent trains is relatively long and short, respectively, and the case where the interval between adjacent trains is locally short. (Hereinafter, unless otherwise specified, the description regarding the feeding state of the power supply station indicates the feeding state of the power converter in that power supply station.)

Figure 2A:
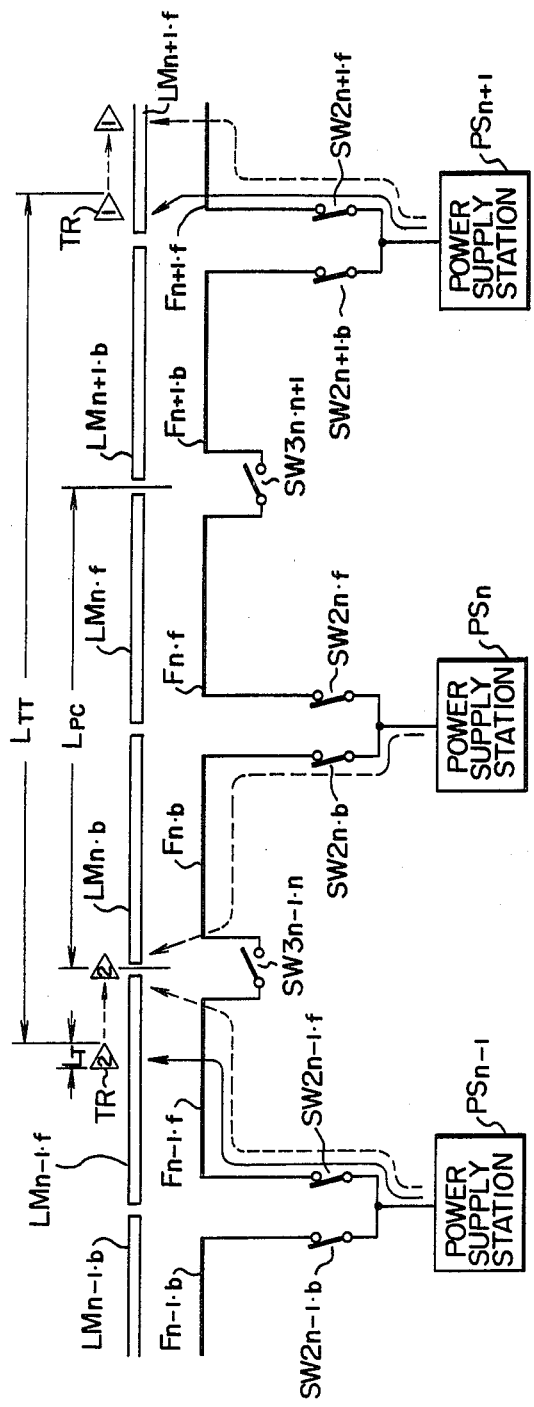

FIG. 2A shows a simplified circuit diagram when the relation between the train interval $L_{TT}$, the length of feeding section $L_{PC}$ and the train length $L_T$ satisfies an inequality formula (1), and FIGS. 2B and 2C show a map of trains under the condition of FIG. 2A and operation diagram for the second and third switches. Operation sequence for the respective switches for the position of the train will be explained with reference to FIG. 4.

$$L_{TT} > (3/2)L_{PC} + L_T \qquad (1)$$

When the trains are operated such that the train interval $L_{TT}$ in FIG. 2A satisfies the inequality formula (1), the third switches ($SW3_{n-1 \cdot n}$, $SW3_{n \cdot n+1}$ etc.) are all opened as shown. The respective second switches ($SW2_{n+1 \cdot f}$, $SW2_{n-1 \cdot f}$ in FIG. 2) connected to the respective linear motor blocks in which trains are present respectively (first train being present in the linear motor block $LM_{n+1 \cdot f}$ and second train being present in the linear motor block $LM_{n-1 \cdot f}$ in FIG. 2) are closed to energize the linear motor units on which the train are present respectively through the first switches which are selectively closed by a signal $SG_1$, by the power converters connected to the closed second switches to operate the trains. (In FIG. 2A, the first switches and the linear motor units are not shown.) The switching of the second and third switches and the actuation of the power converters are also controlled by signals $SG_2$, $SG_3$ and $S_p$, respectively, from a signal processing unit which will be described later, in the similar manner to the first switches. When the train TR is present across two feeding sections (in FIG. 2A, when the train No. 2 TR travels as shown by a broken line the number "2" in a mark ▷ being used to indicate the No. 2 train and, hereinafter the same notation being used), the power supply stations which belong to those two feeding sections fed the linear motor units at which the trains are present. This will be explained in more detail in the following description.

FIGS. 2B and 2C show the positions of the respective trains and the operation of the second and third switches, and the feeding condition of the power supply stations when the trains travel at the train interval mentioned above. The train position shown in FIG. 2A indicates a case 1 as an initial position and a case 2 as a position after the movement shown by the broken line. In FIG. 2C, mark X indicates an open state of the switch and mark O indicates a closed state of the switch. The numeral shown in the circle O indicates the train number to which the power supply station of the associated feeding section feeds. As is seen from FIGS. 2B and 2C, when the train interval satisfies the inequality formula (1) (and the power supply stations are in normal condition), there are two or more linear motor blocks in which no train is present and in most cases every other power supply station is feeding. Accordingly, the utilization factor of the power supply stations is about the same as that of the prior art feeding system. However, as to the number 1 train in the case 1, the second switch $SW2_{n+1 \cdot f}$ must be closed to feed through the power supply station $PS_{n+1}$ but the second switch $SW2_{n+1 \cdot b}$ may be opened. In this manner, the train operation at shorter train interval is permitted. That is, as will be explained later in detail, even if a succeeding train enters the (n+1)-th feeding section and comes into the linear motor block $LM_{n+1 \cdot b}$ while the number 1 train is being fed, the collision of the trains can be avoided by opening the second switch $SW2_{n+1 \cdot b}$ to operate the linear motor block $LM_{n+1 \cdot b}$ in a dynamic brake mode. Accordingly, since one linear motor block can be used as one block section, the train operation at a shorter train interval, that is, at higher density of trains in operation, than those of the prior art feeding system can be attained. (As noted previously, in the prior art feeding system only one train can enter one feeding section for safety reason and hence one full feeding section must be defined as one block section.) Furthermore, when any one of the power supply stations is down, the second and third switches effectively operate to enable the train operation at as short train interval as possible. This will be explained in detail with reference to FIG. 6A et seq.

Even when the grain interval becomes shorter to satisfy the following inequality formula (2), $$(3/2)L_{PC} + L_T \geq L_{TT} > L_{PC} + L_T \qquad (2)$$

the feeding may be achieved without closing the third switches in the same manner as above. In this case, however, as is seen from the circuit diagram of FIG. 3A, the train position diagram of FIG. 3B and the operation diagram of the switches of FIG. 3C, the number of the linear motor block in which no train is present between two trains is in most cases one (in some cases it may be two), and therefore almost all power supply stations are in operation. Accordingly, as will be explained later (with reference to FIG. 10), the control is more complex when any one or more power supply stations are down. Accordingly, it is a practical way to operate the trains at the train interval defined by the inequality formula (2) in normal state to increase the density of trains in operation and when any one of the power supply stations is down the train interval in the feeding sections forward and backward of that feeding section is increased to satisfy the inequality formula (1).

Figure 4:
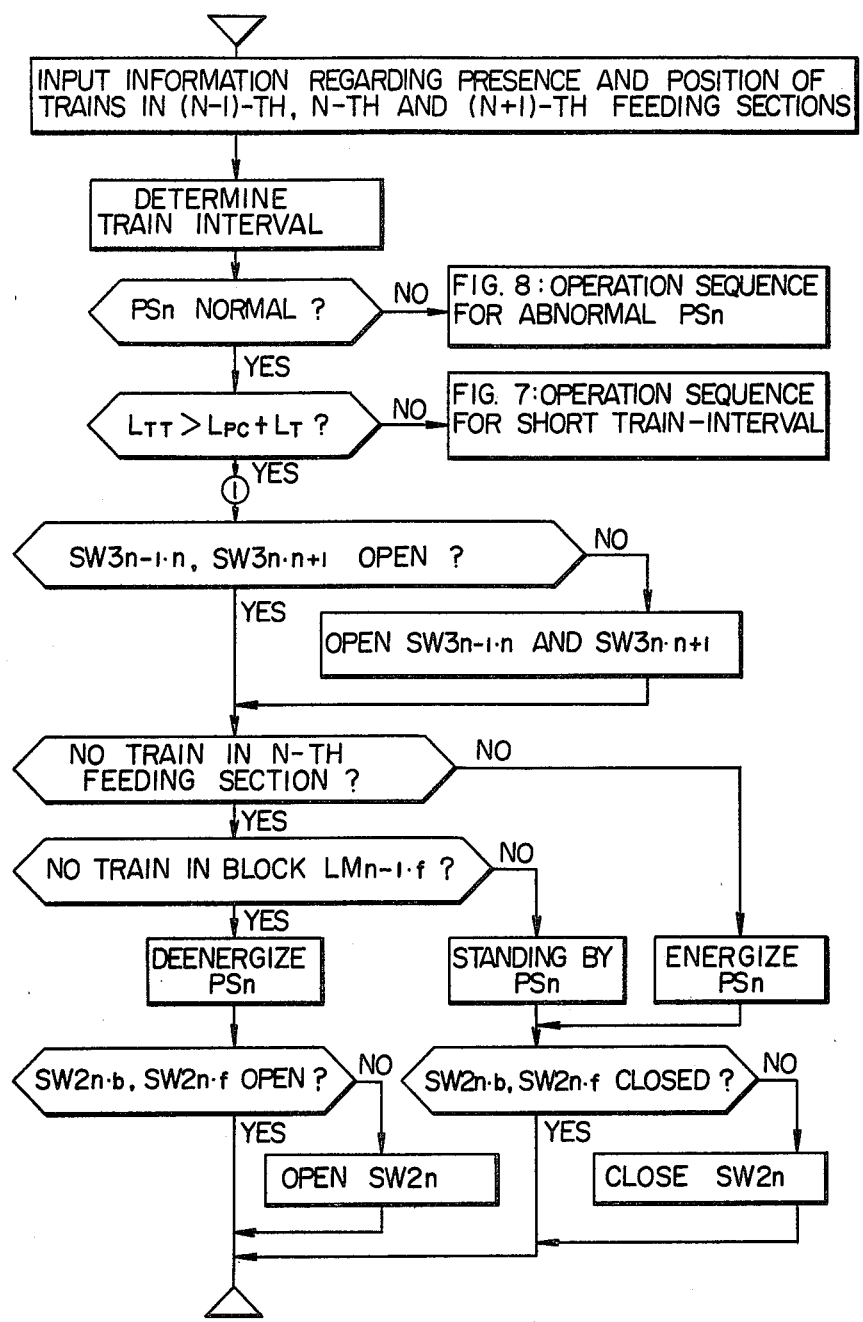
FIG. 4 is a flow chart showing a basic handling sequence of the feeding system.

An example of control sequence of the feeding system described above, particularly a control sequence for the switches is illustrated in FIG. 4 with respect to the n-th feeding section. For the other feeding sections, a similar sequence may be used provided that suffixes n of the respective symbols are replaced by suffixes representative of those feeding sections. The operation sequence for an abnormal state in which any one of the power supply stations is down will be explained later with reference to FIGS. 8, 11 and 12, and the operation sequence for a case where the train interval becomes short also will be explained later with reference to FIG. 7. The inequality formula (2) is used here to determine the train interval.

When the respective power supply stations in the n-th feeding section and the adjacent (n+1)-th and (n−1)-th feeding sections under consideration in FIG. 4 operate normally and the train interval satisfies the condition of the inequality formula (2), the second and third switches are operated in the sequences ① et seq. shown in FIG. 4. That is, the third switches $SW3_{n-1 \cdot n}$ and $SW3_{n \cdot n+1}$ which connect the n-th feeding section with the adjacent (n−1)-th and (n+1)-th feeding sections, respectively, are opened, and the second switches $SW2_{n \cdot f}$ and $SW2_{n \cdot b}$ are opened under the condition that the power supply station $PS_n$ is deenergized if no train is present in the n-th feeding section and no succeeding train is present in the backward (n−1)-th feeding section (i.e. the adjacent linear motor block $LM_{n-1,f}$ in the illustrated requence of FIG. 4). When the succeeding train enters the backward (n−1)-th feeding section (i.e. the linear motor block $LM_{n-1,f}$ in the illustrated sequence of FIG. 4), the second switches $SW2_{n.b}$ and $SW2_{n.f}$ are closed and the power supply station $PS_n$ is put in a standing-by state, and when the train enters the n-th feeding section, the power supply station $PS_n$ starts to feed to control the train. The sequence shown in FIG. 4 is followed subsequently to control the respective feeding sections to operate the trains while maintaining a proper train interval.

In determining the train interval in the above sequence in the most precise and finest way, the result of operation for position information of the trains may be used, but the following method is practical and reliable. As shown in FIG. 5, each linear motor block is subdivided into two zones such as $Z_{bb}$, $Z_{bf}$ and $Z_{fb}$, $Z_{ff}$. A zone in which a train is present provides input information, and if another train is not present in the four zones adjacent to and forward of that zone in which the train is present, it is determined that the train interval from a preceding train satisfies the inequality formula (2). In this case, regarding those four zones (which correspond in length to two feeder means or one feeding section) as one block section for operating the trains, if the preceding train is present within the forward four zones, the succeeding train is braked to maintain the train interval of four or more zone lengths. In this manner, by representing the train position and the train interval by a plurality of zone units defined in the feeding sections, reliable detection information is obtained although the accuracy is lower than that obtained from actual train position information. Thus, the control reliability of the second and third switches is enhanced. Furthermore, when the train interval becomes too short to satisfy the inequality formula (2), the train position control can be done by the unit of zone which is shorter than the linear motor block so that finer control is attained.

In the sequence of FIG. 4, the second switches $SW2_{n.b}$ and $SW2_{n.f}$ may be closed with the succeeding train enters the (n−1)-th feeding section, or when it enters the linear motor block $LM_{n-1,f}$ of the (n−1)-th feeding section, or when it enters the zone $LM_{ff}$ of the block $LM_{n-1,f}$. It is only essential to close those second switches before the train enters the n-th feeding section, but from a standpoint of freedom of control when the train interval becomes short, it is preferable to close the second switches when the train approaches the n-th feeding section as close as possible (that is, when the forward train becomes far away). In the illustrated sequence of FIG. 4, the second switches are closed when the succeeding train enters the linear motor block $LM_{n-1,f}$. As a result, even if a train is present in the linear motor block $LM_{n.b}$ in the n-th feeding section like in the case 3 of FIGS. 2B and 2C, the second switch in the (n+1)-th feeding section may be kept open.

On the other hand, in the sequence of FIG. 4, the second switches $SW2_{n.b}$ and $SW2_{n.f}$ are simultaneously operated when the train interval satisfies the inequality formula (2), but they may be independently operated as are done in the case where the train interval becomes short (cases 1 and 2 in FIG. 6C). In this case, each of the second switches is closed when a train enters the linear motor block which is one block behind the linear motor block to which the second switch in question is connected. In this manner, the linear motor blocks into which the train does not immediately enter are disconnected from the main circuit of the associated power converters by the opening of the associated second switches and hence those linear motor blocks may constitute dynamic braking circuits to form brake sections, as shown in FIGS. 16, 17 and 18. As a result, a safety factor can be increased.

The operation when the train interval becomes short in the sequence of FIG. 4 will now be explained with reference to a simplified circuit diagram of FIG. 6A, a map of trains of FIG. 6B, an operation diagram for the second and third switches of FIG. 6C and a flow chart of operation sequence of FIG. 7.

When the train interval is shorter than $(L_{PC}+L_T)$, two trains may be present in one feeding section. In FIG. 6A, a train interval between a train No. 1 and a train No. 2 is short. If the trains travel as shown in a broken line (corresponding to the case 2 in FIG. 6B), the train No. 2 will be present across the n-th feeding section and the (n+1)-th feeding section. On the other hand, the train No. 1 will be still present in the linear motor block $LM_{n+1,f}$. Therefore, the power supply station $PS_{n+1}$ must continue to feed the linear motor unit in which the train No. 1 is present, through the second switch $SW2_{n+1,f}$, to operate the train. As a result, the train No. 2 is not fed by the power supply station $PS_{n+1}$ and it may be braked. In accordance with the feeding system of the present invention, each feeding section is divided into a plurality of linear motor blocks each connected to the power supply station of the associated feeding section through the associated second switch. Accordingly, when the above case occurs, the second switch of the succeeding train (i.e. $SW2_{n+1,b}$ of the train No. 2 in the illustrated example) is opened so that the linear motor block $LM_{n+1,b}$ operates as a dynamic braking circuit as shown in FIG. 18 to attain indepedent dynamic braking. Thus, even when two trains are present in one feeding section, the forward train can continue to be operated through the power supply station of that feeding section while the succeeding train is dynamic-braked until the preceding train goes out of that feeding section to prevent the collision of the trains and adjust the train interval. If the train interval is not too short when two trains are present in one feeding section, it is appropriate to operate the succeeding train by inertia instead of applying the dynamic brake and close the proper second switch, which has been open, after the preceding train has gone out of that feeding section to operate the succeeding train through the power supply station of that feeding section. The inertia operation of the train can be carried out by keeping open the first switches ($S_{1f}, S_{2f}, \ldots ; S_{1b}, S_{2b} \ldots$ shown in FIG. 1) which connect the linear motor units on which the train is present with the associated feeders, but a safety factor is increased by keeping the second switches open.

As described above, when the train interval does not satisfy the condition of the inequality formula (2) and two trains are present in one feeding section, the second switches for the succeeding train are opened to carry out the dynamic braking or the inertia operation of the train for preventing the collision of the trains and adjusting the train interval. Alternatively, referring to the circuit diagram of FIG. 6A and the operation diagram for the switches shown in FIG. 6C, the succeeding train may be braked by the power supply station of the adjacent feeding section through the third switch. This will be explained below with reference to the flow chart of operation sequence shown in FIG. 7, and FIGS. 6A through 6C.

Figure 7:
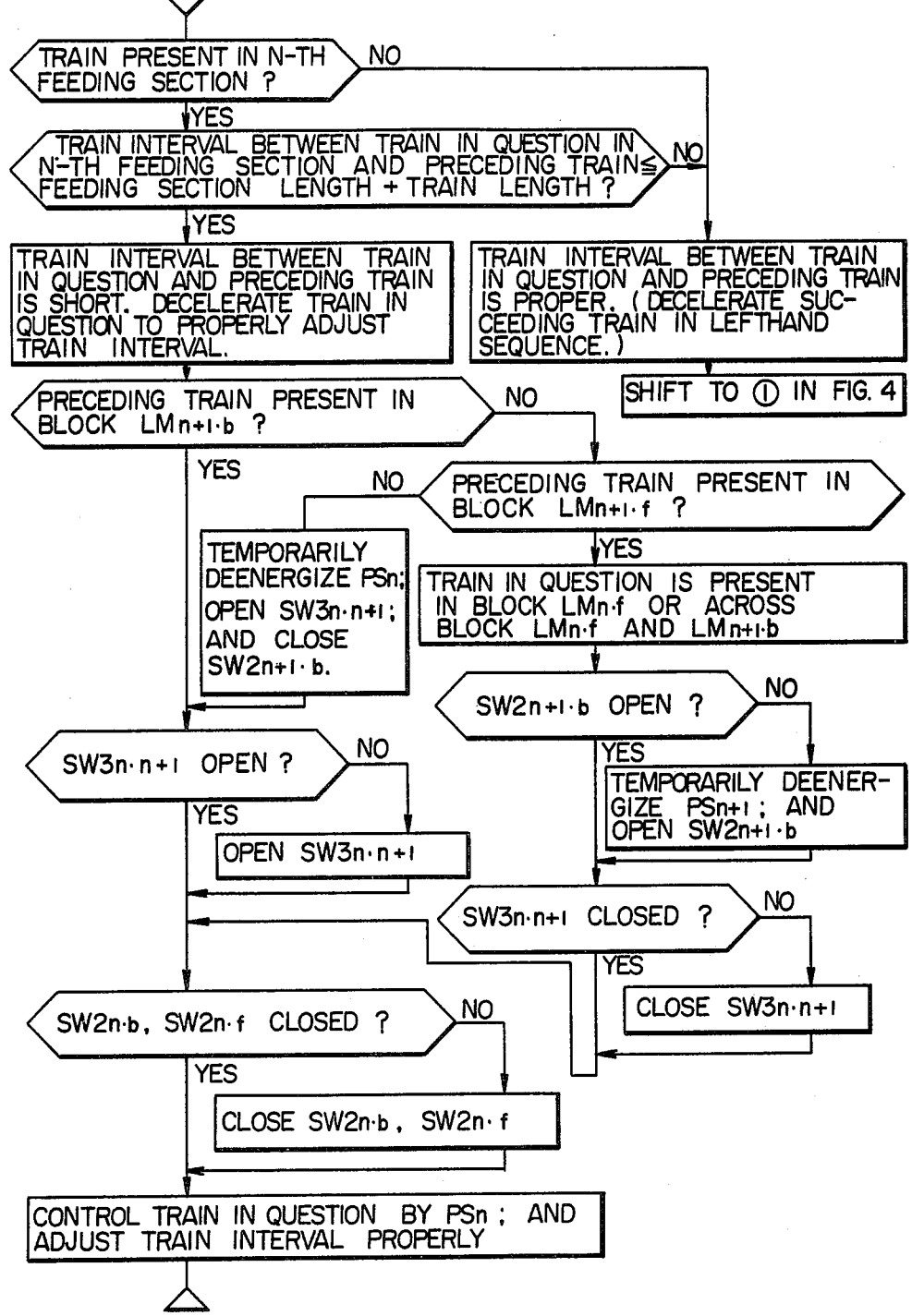
FIG. 7 is a flow chart showing a basic handling sequence when the interval between trains becomes short.

FIG. 7 shows the flow chart of operation sequence primarily for the n-th feeding section. When no train is present in the n-th feeding section or when a train is present therein but the train interval to the preceding train satisfies the condition of the inequality formula (2), the operation sequence for the n-th feeding section follows the sequence ① et seq. shown in FIG. 4, because there is no problem in the train interval. If a train is present in the n-th feeding section and the train interval is too short to satisfy the inequality formula (2), the succeeding train is decelerated around the (n−1)-th feeding section in accordance with the sequence shown in FIG. 7. When the train is present in the n-th feeding section and the train interval between that train and the preceding train is too short to satisfy the inequality formula (2), the second and third switches are operated in one of the following sequences, depending on at what position in the (n+1)-th feeding section the preceding train is present. When the preceding train is present at the linear motor block $LM_{n+1.f}$, that train is present across the linear motor block $LM_{n.f}$ or $LM_{n+1.b}$ (case 1 or 2 in FIG. 6B). Thus, the power supply station $PS_{n+1}$ is temporarily deenergized and the second switch $SW2_{n+1.b}$ is opened, and then the third switch $SW3_{n.n+1}$ is closed. Thereafter, at least the second switch $SW2_{n.f}$ of the n-th feeding section is closed to regenerative-brake the train in the n-th feeding section through the power supply station $PS_n$ for preventing the collision of the trains and adjusting the train interval. The conditions in the n-th and (n+1)-th feeding sections in FIG. 6A represent the above case, and the operating conditions of the switches and the power supply stations correspond to the cases 1 and 2 shown in FIG. 6C. In FIG. 6A, the preceding train TR (train No. 1) is present at the linear motor block $LM_{n+1.f}$ and the succeeding train TR (train No. 2) is present at the linear motor blocks $LM_{n.f}$ and/or $LM_{n+1.b}$. Thus, since the train interval between the preceding and succeeding trains is short, the second switch $SW2_{n+1.b}$ for the backward linear motor block of the (n+1)-th feeding section is opened while the third switch $SW3_{n.n+1}$ which interconnects the adjacent feeder means is closed so that the train No. 2 is fed (regenerative braking) by the power supply station $PS_n$ through the closed second switch $SW2_{n.f}$. Under this condition, even if the train No. 2 fully moves into the linear motor block $LM_{n+1.b}$ so that two trains are present in the (n+1)-th feeding station, the preceding train (train No. 1) is fed (powering operation) by the power supply station $PS_{n+1}$ and the succeeding train (train No. 2) is fed (regenerative braking) by the power supply station $PS_n$ through the third switch $SW3_{n.n+1}$ so that the respective trains are independently controlled by different power supply stations. Accordingly, the prevention of collision of trains and the adjustment of train interval can be easily attained. After the train No. 2 has completely gone out of the linear motor block $LM_{n.f}$, the power supply station $PS_n$ is deenergized, and if a succeeding train (train No. 3) is present at the linear motor block $LM_{n-1.f}$ of the (n−1)-th feeding section, the second switches of the n-th feeding section are kept closed to maintain a standing-by condition. The above sequence is repeated to operate the trains while keeping a proper train interval.

Thus, by constructing the power supply main circuits for the linear motors as shown in FIGS. 1 and 2A and following the operation sequence as shown in FIGS. 4 and 7, the operation of the trains can be effectively controlled even when the train interval is shorter than one feeding section length. This contributes to increase the density of trains in operation (which corresponds, in the linear motor transportation system, to the utilization factor of the power supply stations installed on the ground). The density of trains in operation will be discussed in more detail after the following explanation of operation for a case where one or more of the power supply stations is down.

In the linear motor transportation system, even if one or more of the power supply stations installed on the ground are down, the train has to be able to run, without trouble, through the feeding section to which the down power supply station belongs. Otherwise, the operation of the trains will be stopped. As an approach thereto, duplicate power supply stations may be installed in each feeding staion. That is, two power supply stations having the same power are provided with one of them being used as spare, or two power supply stations each having one half of normally required power are provided and those two power supply stations are operated in parallel or series during normal state and when one of the two power supply stations is down it is disconnected and the remaining normal one is used to carry out the operation at one half of the normal power. However, this needs redundant installation. In the circuit configuration shown in FIG. 1, which is an embodiment of the present invention, the following operation sequence may be taken to attain continued operation of the trains even if one or more of the power supply stations are down.

The following explanation is for the case where the power supply station $PS_n$ of the n-th feeding section is down.

When the power supply station $PS_n$ of the n-th feeding section is down or abnormal in the sequence of FIG. 4, the n-th feeding section is handled in accordance with a sequence shown in FIG. 8. That is, the power supply station $PS_n$ is deenergized and the second switches $SW2_{n.b}$ and $SW2_{n.f}$ are opened. The control for the linear motor block $LM_{n.b}$ follows the operation sequence for the (n−1)-th feeding section shown in FIG. 11 and the control for the linear motor block $LM_{n.f}$ follows the operation sequence for the (n+1)-th feeding section shown in FIG. 12.

Figure 9A:
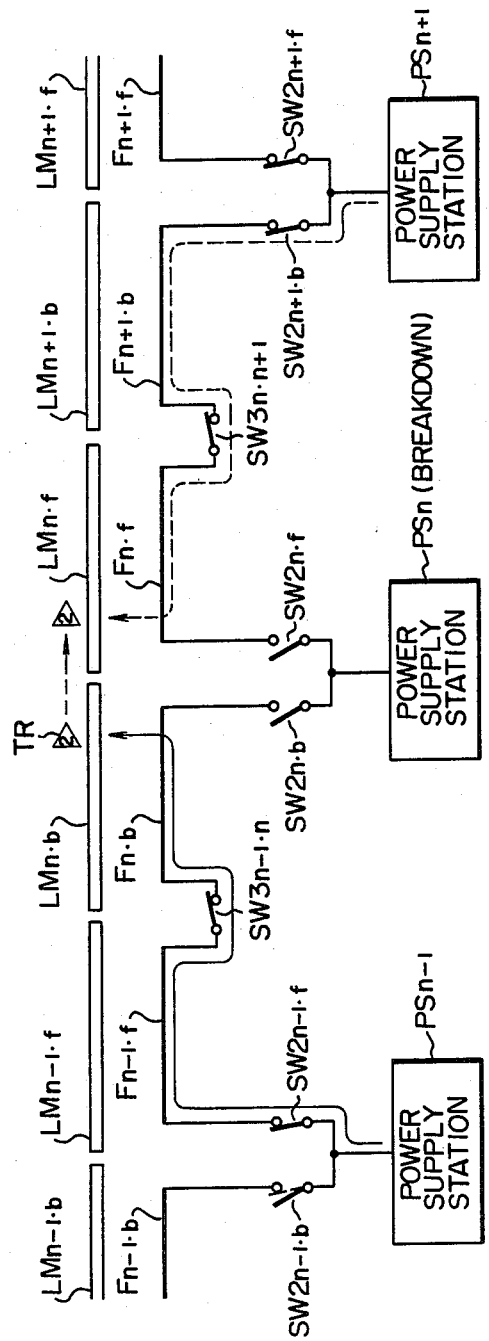

Referring to FIGS. 9A, 9B and 9C, the operation sequence is explained for the case where the train interval satisfies the inequality formula (1) and the power supply station $PS_n$ is down. FIG. 9A shows the train position for the case 2 in FIGS. 9B and 9C and the circuit condition for the case 4 in which the train TR No. 2 has moved as shown by broken line from the position shown in FIG. 9A. In the case 2 shown, the linear motor block $LM_{n.b}$ at which the train TR No. 2 is present is fed by the power supply station $P_{n-1}$ through the previously closed second switch $SW2_{n-1.f}$ and the third switch $SW3_{n-1.n}$. The linear motor block $LM_{n.f}$ into which the train is to enter next has been connected to the power supply station $PS_{n+1}$ which is in a stand-by state through the closed third switch $SW3_{n.n+1}$ and the closed second switch $SW2_{n+1.b}$. When the train in question partially enters the linear motor block $LM_{n.f}$, the power supply station $PS_{n+1}$ which has been standing-by starts to feed. While the train is present across the two linear motor blocks $LM_{n.b}$ and $LM_{n.f}$, it is fed by the power supply stations $PS_{n-1}$ and $PS_{n+1}$ (the case 3 in FIGS. 9B and 9C). After the train has completely gone out of the linear motor block $LM_{n \cdot b}$, the power supply station $PS_{n-1}$ is deenergized and the second switch $SW2_{n-1 \cdot b}$ is closed to make it ready for a succeeding train which is to come next. Thus, the power supply station $PS_{n-1}$ is put in waiting state and the rain No. 2 in question continues to be operated by the power supply station $PS_{n+1}$ (the case 4 in FIGS. 9B and 9C). In a similar way, the (n−1)-th feeding section and the linear motor block $LM_{n \cdot b}$ are operated in the sequence shown in FIGS. 11A and 11B, and the (n+1)-th feeding section and the linear motor block $LM_{n \cdot f}$ are operated in the sequence shown in FIG. 12.

In the example shown in FIGS. 9A through 9C, the train interval satisfies the ineqaulity formula (1) as described above. Therefore, even if one or more of the power supply stations, e.g. the power supply station $PS_n$, are down, the train need not be inertia-operated or dynamic-braked in that section but it can be operated normally (e.g. powering) by the adjacent power supply stations $PS_{n-1}$ and $PS_{n+1}$. Accordingly, the operation schedule of the trains need not be altered. However, when the train interval is too short to satisfy the ineqaulity formula (1), the inertia-operation or dynamic braking may be needed in some sections.

Figure 10A:
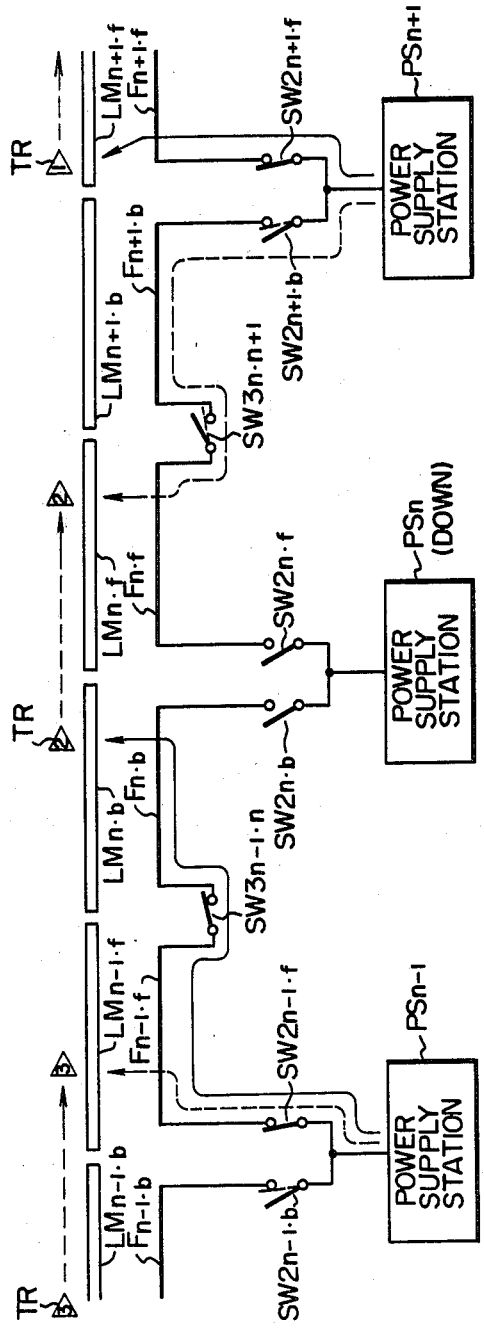

FIGS. 10A, 10B and 10C illustrate the operation sequence when the train interval $L_{TT}$ is short as defined by the inequality formula (2), and the power supply stations $PS_n$ is down. The condition when the trains TR No. 1, No. 2 and No. 3 move in FIG. 10A corresponds to the case 1 shown in FIGS. 10B and 10C, and the train TR (train No. 2) in the linear motor block $LM_{n \cdot b}$ is fed by the power supply station $PS_{n-1}$ through the third switch $SW3_{n-1 \cdot n}$. Since the succeeding train TR (train No. 3) is present in the linear motor block $LM_{n-1 \cdot b}$ of the (n−1)-th feeding section (and hence the train interval is short), the second switch $SW2_{n-1 \cdot b}$ is opened to operate the train No. 3 in the inertial operation mode or dynamic braking mode. After the train No. 2 has compltely gone out of the linear motor block $LM_{n \cdot b}$ (i.e. the case 2 in FIGS. 10B and 10C), the second switch $SW2_{n-1 \cdot b}$ is closed and the train No. 3 is fed by the power supply station $PS_{n-1}$. On the other hand, since the train TR (train No. 1) which is present in the (n+1)-th feeding section forward of the n-th feeding section which is now down is fed by the power supply station $PS_{n+1}$, the third switch $SW3_{n \cdot n+1}$ and the second switch $SW2_{n+1 \cdot b}$ are kept open as shown in FIGS. 10A and 10C until the case 4 where the train No. 1 compltely goes out of the (n+1)-th feeding section and the linear motor blocks $LM_{n \cdot f}$ and $LM_{n+1 \cdot b}$ are decided as an inertial operation or dynamic braking section to decelerate the succeeding train which will enter that blocks. After the train No. 1 has compltely gone out of the linear motor block $LM_{n+1 \cdot f}$, the third switch $SW3_{n \cdot n+1}$ and the second switch $SW2_{n+1 \cdot b}$ are closed so that the train No. 2 is fed by the power supply station $PS_{n+1}$. In a similar way, the (n−1)-th feeding section and the linear motor block $LM_{n \cdot b}$ are operated in the sequence shown in FIGS. 11A and 11B, and the (n+1)-th feeding section and the linear motor block $LM_{n \cdot f}$ are operated in the sequence shown in FIG. 12.

The operation sequence for the case where one or more power supply stations, e.g. the power supply station $PS_n$, are down has been explained above with reference to FIGS. 9 to 12. Referring now to the flow chart of FIG. 11A, the operation sequence for a case where the train interval becomes extremely short is supplementarily explained. Abnormal proximity occurs when two trains are present in both of the adjacent linear motor blocks. In the flow shown on the left hand of the drawing, the abnormal proximity is shown as the trains being present in both of the adjacent linear motor blocks $LM_{n \cdot b}$ and $LM_{n-1 \cdot f}$. Even if the power supply station is not down, such a state that two trains are present in one linear motor block is of course abnormal proximity. In the case of such abnormal proximity, the succeeding train should be braked while the preceding train should be in a powering mode to prevent the collision and adjust the train interval.

In the transportation system having the linear motor installed on the ground, the trains are operated by controlling the feeding to the linear motor units, as described above. In this case, one power supply station is basically used to control the feeding to one train. (In a linear synchronous motor, it is difficult to control the feeding by one power supply station to two trains of different velocities and different phases but in a linear induction motor it is possible in a certain degree. However, in any case, the operation of two trains by one power supply station poses a problem of variation of driving force and is not practical.) Accordingly, in the case of abnormal proximity in which one train is fed by a power supply station while a succeeding train is present at the linear motor block connected to the feeder of the same power supply station, it is necessary to brake the succeeding train in the following manner. As shown in the flow chart on the left hand of FIG. 11A, in the case of the abnormal proximity described above, the first switch which connects the linear motor unit on which the succeeding train is present with the associated feeder is not permitted to be closed and the succeeding train is operated in an inertia operation mode (or a deceleration mode due to running resistance such as air resistance). In case of emergency, a mechanical brake provided on the train (the linear motor transportation system is usually equipped with brake shoes) is operated. On the other hand, the first switch which connects the linear motor unit on which the preceding train is present with the associated feeder is kept controllable so that the train is operated in a powering mode by the power supply station for preventing the collision of the trains. When the two trains which are in abnormal proximity are present in different feeding stations, the operation sequence therefor follows the flow chart of FIG. 7, and when the two trains are present in the same feeding section the operation is controlled in accordance with the sequence shown in FIG. 13, like the case described above. For example, when the adjacent trains are present at different linear motor blocks $LM_{n \cdot f}$ and $LM_{n \cdot b}$ in the n-th feeding section, the second switch $SW2_{n \cdot b}$ for the succeeding train is closed so that the succeeding train is operated in an inertia operation mode, or in a dynamic braking mode by the circuit shown in FIG. 18 while the preceding train is operated in a powering mode by the power supply station $PS_n$ of the n-th feeding section for preventing the collision of trains. (In the above explanation, it was assumed that the power supply station $PS_n$ is operating normally.)

The basic operation sequence for the feeding system for the linear motor transportation system in accordance with the present invention has been explained in conjunction with FIGS. 2 to 7, the operation sequence for the case where one or more power supply stations are down has been explained with reference to FIGS. 8 to 12, and the operation sequence for the abnormal proximity in which two trains are present in one and the same feeding section has been explained with reference to FIGS. 13 and 11. In the embodiment of the present invention described above, since each of the feeding sections is divided into a plurality of linear motor blocks which are connected to the associated power supply station through the respective second switches, the trains are operated safely even when the train interval is shorter than one feeding section length, and even if one or more power supply stations are down the linear motor blocks in the feeding section to which the down power supply station belongs can be fed by the different power supply stations, that is, those in forward and backward feeding sections so that the trains are continuously operated. Since a high degree of freedom in operating a plurality of trains is attained in this manner, the density of trains in operation (which corresponds to the utilization factor of the power supply stations in the linear motor transportation system as described above) can be increased as will be explained in the following example.

It is desirable to determine the feeding section length $L_{PC}$ based on the operation time interval $t_{TT}$ of the trains, the train velocity $V_T$ and the train length $L_T$ in the following manner. However, a voltage drop across the feeder should be taken into consideration when the feeding section length $L_{PC}$ is long. As an example, when the operation time interval $t_{TT}$ is 300 seconds (5 minutes), the train velocity $V_T$ is 139 m/second (500 km/hour) and the train length $L_T$ is 400 m, the train interval $L_{TT}$, which is the product of $V_T$ and $t_{TT}$, is equal to 41700 m.

When the train interval $L_{TT}$ and the feeding section length $L_{PC}$ are selected to satisfy the inequality formula (1), $L_{PC}$ is approximately 27 km. When they are selected to satisfy the inequality formula (2), $L_{PC}$ is approximately 40 km.

On the other hand, a ratio of the number $N_T$ of the trains in the transport path to the number $N_{PC}$ of the power supply stations is given by;

$$\frac{\text{number } N_T \text{ of trains}}{\text{number } N_{PC} \text{ of power stations}} = \frac{\text{feeding section length } L_{PC}}{\text{train interval } L_{TT}} \quad (3)$$

It represents the utilization factor of the power supply stations in the linear motor transportation system. When the ratio is equal to 1, it indicates that each power supply station is always working for one train and hence the utilization factor is 100%. However, in the transportation system having the linear motors installed on the ground, the one-to-one correspondence described above cannot be attained but the ratio is smaller than 1 because the train may run across two feeding sections and in such a case the train must be fed by two power supply stations. (Otherwise, the driving force may vary giving bad feeling to the passengers.)

When the feeding section length of 28 km is selected to satisfy the inequality formula (1), the ratio is equal to 0.65, and when it is selected to 40 km to satisfy the inequality formula (2), the ratio is equal to 0.96. In the prior art feeding system described before, the ratio is 0.5 or less because no train should be present in the feeding sections forward of and backward of a feeding section in which one train is present. It is seen from the above that the feeding system for the linear motor in accordance with the present invention provides a high utilization factor of the power supply station or in other words it can increase the density of train in operation. Furthermore, in the prior art feeding system described before, when any one of the power supply station is down the operation of train through that section is blocked. In the present invention, the operation similar to normal operation is attained as shown in FIGS. 9B and 9C by selecting the train interval to satisfy the inequality formula (1). Furthermore, even when the train interval is short to satisfy the inequality formula (2), the operation of the trains is not blocked although some trains are operated in an inertia operation mode as shown in FIGS. 10B and 10C. When one of the power supply stations is down, however, it is desirable to operate the trains such that the train interval between a train in the down feeding section and the trains forward and backward thereof satisfies the inequality formula (1) because this enables as smooth feeding control as that attained in normal state.

In the feeding system for the linear motor as shown in the embodiment shown in FIG. 1 and subsequent figures, where one power supply station is provided for each feeding section, each feeding section being divided into a plurality of linear motor blocks, each of the linear motor blocks being connected to the power supply station in the associated feeding section through the associated second switches, each of the feeders for the linear motor blocks in each feeding section being connected with the adjacent feeders for the respective linear motor blocks in the adjacent feeding sections through the associated third switches, another advantage is obtained as will be explained below.

In the construction shown in FIG. 14A, the linear motor units in each feeding block are not divided into a plurality of blocks and the feeders of adjacent feeding sections are interconnected through the third switches $SW3_{n-2 \cdot n-1}$, $SW3_{n-1 \cdot n}$, ..., and in the construction shown in FIG. 14B, the linear motor units in each feeding section are divided into two blocks and the feeders in the adjacent feeding sections are interconnected through the third switches $SW3_{n-2 \cdot n-1}$, $SW3_{n-1 \cdot n}$, ... . In FIGS. 14A and 14B, it is assumed that the power supply station $PS_n$ is down. The power supply station $PS_n$ is disconnected from the feeder by cutting-off second switch or switches ($SW2_n$ in FIG. 14A and $SW2_{n \cdot b}$ and $SW2_{n \cdot f}$ in FIG. 14B). When the trains TR are operated at the train interval which satisfies the inequality formula (1) while one of the power supply stations is down, the following difference is noted between the constructions of FIG. 14A and FIG. 14B. When trains No. 1, No. 2 and No. 3 are present at the positions shown by solid line marks ▷, the linear motor units under the respective trains are fed, both in FIG. 14A and in FIG. 14B, by the power supply stations $PS_{n+1}$, $PS_{n-1}$ and $PS_{n-2}$, respectively, through the second switches, the feeders, (additionally the third switch for the train No. 2 in the n-th feeding section), and the first switches not shown, as shown by solid line arrows. When the trains No. 1, No. 2 and No. 3 move to the positions shown by broken line marks ▷, the linear motor units under the respective trains are fed by the power supply stations $PS_{n+2}$, $PS_{n+1}$ and $PS_{n-1}$, respectively, as shown by broken line arrows. Now noticing the train No. 2 which is present in the n-th feeding section, it is fed by the power supply station $PS_{n-1}$ when it is at the initial position, but it is fed by the power supply station $PS_{n+1}$ when it is at the second position. Accordingly, in the case of FIG. 14A, each of the third switches $SW3_{n-1 \cdot n}$ and $SW3_{n \cdot n+1}$ must be switched. That is, at the initial state in FIG. 14A, the third switch $SW3_{n-1 \cdot n}$ is closed and the third switch $SW3_{n \cdot n+1}$ is opened so that the power supply station $PS_{n-1}$ feeds the linear motor block $LM_n$, but when the train No. 2 has displaced to its second position the third switch $SW3_{n-1 \cdot n}$ is opened and the third switch $SW3_{n \cdot n+1}$ is closed so that the power supply station $PS_{n+1}$ feeds the linear motor block $LM_n$. (The train No. 2 is now fed by the power supply station $PS_{n+1}$ because the preceding train No. 1 has entered the next or (n+2)-th feeding section and the power supply station $PS_{n-1}$ has to feed the succeeding train No. 3.) Accordingly, in the feeding system of FIG. 14A, each of the third switches which connect the down n-th feeding section to the adjacent (n−1)-th and (n+1)-th feeding sections must be switched. To this end, the feeding to the linear motor block $LM_n$ is temporarily stopped. As a result, the driving force of the train in the down feeding section varies at the time of switching of the third switches and bad feeling is presented to the passengers. On the contrary, as shown in FIG. 14B, when each feeding section is divided into two linear motor blocks and each linear motor block is connected to the power supply station of the associated feeding section through the respective second switches, and the associated feeders of the adjacent linear motor blocks which belong to the adjacent feeding sections are interconnected through the third switches, the train No. 2 can be fed by the power supply station $PS_{n-1}$ or $PS_{n+1}$ as it travels while the third switches $SW3_{n-1 \cdot n}$ and $SW3_{n \cdot n+1}$ are kept closed, because, in the present example, the respective feeders for the linear motor blocks $LM_{n \cdot b}$ and $LM_{n \cdot f}$ are disconnected from each other by opening both the second switches $SW2_{n \cdot b}$ and $SW2_{n \cdot f}$. Accordingly, there are advantages that the driving force does not vary since the feeding is not interrupted, and the third switches need not be switched.

Referring to FIG. 15, the feeding system is explained for the case where the power supply stations which belong to the adjacent two feeding sections are both down. The construction of FIG. 15 is similar to that of the feeding system shown in FIG. 1 except that fourth switches are provided between the second switches and the associated power supply stations. In this configuration, when the power supply stations $PS_n$ and $PS_{n+1}$ are down, the fourth switches $SW4_n$ and $SW4_{n+1}$ are opened to disconnect the power supply stations $PS_n$ and $PS_{n+1}$ while the third switch $SW3_{n \cdot n+1}$ which interconnects the respective feeders of the down power supply stations $PS_n$ and $PS_{n+1}$ is opened to disconnect the interconnection between those feeders. Under this condition, in order to feed the linear motor blocks $LM_{n-1 \cdot f}$, $LM_{n \cdot b}$ and $LM_{n \cdot f}$ from the normal power supply station $PS_{n-1}$, the fourth switch $SW4_{n-1}$, the second switches $SW2_{n-1 \cdot f}$, $SW2_{n \cdot b}$ and $SW2_{n \cdot f}$ and the third switch $SW3_{n-1 \cdot n}$ are closed. On the other hand, in order to feed the linear motor blocks $LM_{n+1 \cdot b}$, $LM_{n+1 \cdot f}$ and $LM_{n+2 \cdot b}$ from the normal power supply station $PS_{n+2}$, the second switches $SW2_{n+1 \cdot b}$, $SW2_{n+1 \cdot f}$ and $SW2_{n+2 \cdot b}$, the third switch $SW3_{n+1 \cdot n+2}$ and the fourth switch $SW4_{n+2}$ are closed; and in order to feed the linear motor block $LM_{n-1 \cdot b}$ from the normal power supply station $PS_{n-2}$ (not shown) of the (n−2)-th feeding section, the third switch $SW3_{n-2 \cdot n-1}$ is closed and the second switch $SW2_{n-1 \cdot b}$ is opened to disconnect the linear motor block $LM_{n-1 \cdot b}$ from the power supply station $PS_{n-1}$. In a similar manner, the third switch $SW3_{n+2 \cdot n+3}$ is closed to feed the linear motor block $LM_{n+2 \cdot f}$ from the power supply station $PS_{n+3}$ (not shown) of the (n+3)-th feeding section, and the second switch $SW2_{n+2 \cdot f}$ is opened to disconnect the linear motor block $LM_{n+2 \cdot f}$ from the power supply station $PS_{n+2}$. In this manner, the (n−2)-th feeding section and the linear motor block $LM_{n-1 \cdot b}$ are fed by the power supply station $PS_{n-2}$ (not shown), the linear motor block $LM_{n-1 \cdot f}$ and the n-th feeding section are fed by the power supply station $PS_{n-1}$, the (n+1)-th feeding section and the linear motor block $LM_{n+2 \cdot b}$ are fed by the power supply station $PS_{n+2}$, and the linear motor block $LM_{n+2 \cdot f}$ and the (n+3)-th feeding section are fed by the power supply station $PS_{n+3}$. In this manner, each of the power supply stations $PS_{n-2}$, $PS_{n-1}$, $PS_{n+2}$ and $PS_{n+3}$ serves to feed three linear motor blocks to continuously drive the trains. In this case, the trains are preferably operated in those sections at the train interval which satisfies the inequality formula (1) to prevent more than one train from entering the feeding range of each power supply station. In the feeding sections other than those described above, each power supply station feeds to two linear motor blocks in the same manner as described above. The switching of the fourth switches are controlled by a signal $SG_4$ from the signal processing unit which will be described later, as is the case for the other switches.

Now, the dynamic braking and the detection of train position discussed in the above explanation are described in detail.

In the linear motor transportation system which controls the feeding by the power supply stations installed on the ground, dynamic braking is carried out when the train interval is short, or any one of the power supply stations is down or in case of emergency such as power failure, as described above. The dynamic braking may be carried out by opening the second switch $SW2$ and closing a fifth switch $SW5$ to connect a dynamic brake device $DB$ including a resistor or the like in parallel with the linear motor unit $ULM_2$ as shown in FIG. 16. A voltage induced at the linear motor unit causes a short circuit current to flow through the dynamic brake device $DB$ as shown by a broken line in FIG. 16 to produce a braking force. The braking energy is consumed as a resistive loss in the short circuit.

FIG. 17 shows a status of the feeding system corresponding to the case 3 in FIGS. 10B and 10C. When the power supply station $PS_n$ is down and the train interval satisfies the inequality formula (2) and the trains are at the positions shown (case 3 in FIGS. 10B and 10C), the power supply station $PS_{n+1}$ feeds the train No. 1 (not shown) in the linear motor block $LM_{n+1 \cdot f}$ while the power supply station $PS_{n-1}$ feeds the train No. 3 in the linear motor block $LM_{n-1 \cdot f}$. Accordingly, the train No. 2 in the linear motor block $LM_{n \cdot f}$ must be operated in an inertia operation mode or in a dynamic braking mode by closing a fifth switch $SW5_{n \cdot f}$ to insert the dynamic brake device $DB_{n \cdot f}$. A dynamic brake device $DB_{n+1 \cdot b}$ is inserted in the linear motor block $LM_{n+1 \cdot b}$ by closing a fifth switch $SW5_{n+1 \cdot b}$ because the linear motor block $LM_{n+1 \cdot b}$ is to be used as a dynamic braking section as safety measure for preventing the collision of trains since the train No. 1 (not shown) forward of the train No. 2 is present at the linear motor block $LM_{n+1 \cdot f}$ of the (n+1)-th feeding section.

In the feeding system in which each feeding section is divided into a plurality of linear motor blocks, the dynamic brake device may be inserted either between the feeder and the second switch as shown in FIG. 17 or between the second switch and the fourth switch as shown in FIG. 19. FIG. 18 illustrates the former case. It is effective when a train is present in a forward linear motor block in a feeding section and a succeeding train enters a backward linear motor block in the same feeding section, as shown in FIG. 18. Referring to FIG. 18, when the train No. 1 is present at the linear motor block $LM_{n \cdot f}$ of the n-th feeding section and the succeeding train No. 2 enters the linear motor block $LM_{n \cdot b}$, the train No. 1 is fed (in a powering mode) by the power supply station $PS_n$ by closing the second switch $SW2_{n \cdot f}$ while the train No. 2 is operated in a dynamic braking mode by opening the second switch $SW2_{n \cdot b}$ and closing the fifth switch $SW5_{n \cdot b}$ to couple the dynamic brake device $DB_{n \cdot b}$. Accordingly, even if a train is present in a feeding section and a succeeding train enters the same feeding section, the collision of the trains can be prevented and the train interval can be rapidly lengthened. On the other hand, in the example shown in FIG. 19, the dynamic brake device $DB_n$ is connected between the second switches $SW2_{n \cdot b}$ and $SW2_{n \cdot f}$ and the fourth $SW4_n$ through the fifth switch $SW5_n$. It has an advantage over the example of FIG. 18 in that the number of the dynamic brake devices can be decreased but it also has a disadvantage in that it cannot afford fine control as the example of FIG. 18 does, in which FIG. 18 when two trains are present in the n-th feeding section the preceding train is fed by the associated power supply station while the succeeding train in dynamic-braked. (However, when the trains are operated at a sufficiently long train interval, the occurrence of the above case can be avoided and the arrangement of FIG. 19 which is simpler than that of FIG. 18 may be used.) The switching operations of the fifth switch are also controlled by a signal $SG_5$ from the signal processing unit which will be described later, as is the case for other switches.

In the embodiments described above, the detection of train positions necessary to control the feeding system may be carried out by well-known optical position detection method of cross induction line method. A preferred train position detection system which is effective to the feeding system in which each feeding section is divided into a plurality of linear motor blocks will be described below.

FIG. 20 shows a block diagram illustrating position detection ranges and a method of transmission of position detection information with other feeding sections when well-known position detection means such as cross induction line method is used. In FIG. 20, the well-known position detection means such as cross induction lines $D_{n-2 \cdot f}$, $D_{n-1 \cdot b}$, $D_{n-1 \cdot f}$ . . . are arranged one for each of the linear motor blocks $LM_{n-2 \cdot f}$, $LM_{n-1 \cdot b}$, $LM_{n-1 \cdot f}$, . . . , respectively, and signals therefrom are received by receivers $R_{n-2 \cdot f}$, $R_{n-1 \cdot b}$, $R_{n-1 \cdot f}$, . . . , respectively. The position detection signals received by the receivers are processed by position signal processing units $DC_{n-2}$, $DC_{n-1}$, $DC_n$, . . . , respectively. The position signal processing units, e.g. unit $DC_n$, transmits the train position information in the n-th feeding section received by the receivers $R_{n \cdot b}$ and $R_{n \cdot f}$ to the position signal processing units $DC_{n-1}$ and $DC_{n+1}$ respectively provided in the adjacent (n−1)-th and (n+1)-th feeding sections and it also receives train position information in the adjacent feeding sections from the position signal processing units $DC_{n-1}$ and $DC_{n+1}$ respectively provided in the adjacent (n−1)-th and (n+1)-th feeding sections. When the switches of the feeding system as shown in FIG. 1 are to be operated in the sequences described above, if the position detection range is assigned to each linear motor block as shown in FIG. 20, an absolute position detection is attained at the unit of at least one linear motor block. (A train position within a linear motor block can be detected at the unit of cross pitch of the cross induction lines but the absolute position may be erroneously detected if the signals at the unit of cross pitch are incorrectly counted.) Accordingly, the train position detection at the unit of linear motor block is more reliable. The signal processing units each stores a control program based on the flow charts described above and they respond to the input position information to transmit necessary controls $SG_1$, $SG_2$, $SG_3$, $SG_4$, $SG_5$ and $SG_p$, based on the stored program, to the first switches, the second switches, the third switches, the fourth switches, the fifth switches and the power supply stations, respectively, of the associated feeding sections to control the operations thereof. Instead of storing the control programs in the signal processing units, they may be stored in a central processing unit (CPU), not shown, and the respective signal processing units transfer the position information to the CPU which, in turn, transmits the necessary control signals $SG_1$, $SG_2$, $SG_3$, $SG_4$, $SG_5$ and $SG_p$ to the feeding sections.

The basic idea of determining the feeding section length in the feeding system of the present invention has been explained above. The determination of the feeding section length at a special section, that is, a section near a railway station will now be described. Assuming that an acceleration/deceleration rate of the train is 3.6 km/hour/second, a maximum speed of the train is 500 km/hour, stop period at the railway station is one minute and a train interval is five minutes, a minimum train interval across the railway station is approximately equal to 14.4 km which is shorter than the train interval (41.7 km) when the trains are running at a high speed. Accordingly, as shown in FIGS. 21A and 21B, the feeding section length near the railway station should be shorter than the feeding section length in the high speed running section. In FIGS. 21A and 21B, the length of each of the linear motor blocks $LM_{n \cdot b}$ and $LM_{n \cdot f}$ is selected to be equal to one half of the normal feeding section length of approximately 9 km which is determined from the inequantity formula (1) assuming that the train interval is 14.4 km, and the length of each of the linear motor blocks $LM_{n-1 \cdot f}$ and $LM_{n+1 \cdot b}$ is equal to the linear motor block length in the high speed running section which is determined from the inequality formula (1), provided that one or two linear motor blocks in which no train is present are provided between the trains (for safety reason), taking the acceleration/deceleration rate and the stop period into consideration. In FIGS. 21A and 21B, the controls for deceleration, stopping and the initial acceleration for trains are carried out by the power supply station $PS_n$. FIG. 21A shows the train position when the train No. 2 has stopped at the railway station. The train interval between the train No. 2 and the train No. 1 is approximately 23.7 km, and the train interval between the train No. 2 and a succeeding train (not shown) is approximately 32 km. FIG. 21B shows the train position when the train interval between the train No. 2 and the train No. 3 is minimum, approximately 14.4 km. As described above, by reducing the linear motor block length near the railway station so that one or more linear motor blocks are provided between the trains, the trains can be operated in the sequence shown in FIG. 4 with safety and a high utilization factor of the power supply stations.

According to the present invention, a feeding system for a linear motor transportation system which has an increased density of trains in operation and a higher utilization factor of the power supply stations is provided.

What we claim is:

1. A feeding system for a linear motor transportation system having a number of discrete drive coil units or linear motor units serially arranged along a track to generate a moving magnetic field for driving vehicles, said feeding system comprising:
    a number of feeding sections serially contiguously extending along said track, said linear motor units being assigned to said feeding sections;
    at least one power supply station arranged at each of said feed sections;
    each of said feeding sections being divided into at least two linear motor blocks so as to extend serially contiguously along said track;
    two feeder means arranged respectively corresponding to said at least two linear motor blocks in each of said feeding sections;
    a first group of switch means, each of the linear motor units belonging to one of said two linear motor blocks of each of said feeding sections being connected to the associated one of said two feeder means through a corresponding one of said first group of switch means, and each of the linear motor units belonging to the other of said two linear motor blocks being connected to the other of said two feeder means through a corresponding one of said first group of switch means;
    a second group of switch means, each of said two feeder means arranged in each of said feeding sections being connected to the associated power supply station through corresponding ones of said second group of switch means; and
    means for controlling said second group of switch means in a manner so that at least one of said second group of switch means connected to a corresponding one of said linear motor blocks through a corresponding one of said feeder means and corresponding ones of said first group of switch means is closed when a vehicle exists within said corresponding one linear motor block and that when before another vehicle succeeding said first mentioned vehicle enters a linear motor block backwardly adjacent to said corresponding one linear motor block at least another one of said second group of switch means connected to said backwardly adjacent linear motor block is opened at latest before said succeeding vehicle enters said backwardly adjacent linear motor block.

2. A feeding system according to claim 1 further comprising:
    a third group of switch means, each adjacent two of said feeder means respectively belonging to adjacent different feeding sections being interconnected through corresponding one of said third group of switch means.

3. A feeding system according to claim 2 further comprising:
    a fourth group of switch means, each of said second group of switch means being connected to the associated power supply station through corresponding one of said fourth group of switch means.

4. A feeding system according to claim 3 further comprising:
    a fifth group of switch means; and
    a plurality of dynamic brake means each connected to corresponding one of said fourth group of switch means through corresponding one of said fifth group of switch means, at the junction portion between the fourth switch means and the second switch means connected thereto.

5. A feeding system according to claim 2 further comprising:
    a fifth group of switch means; and
    a plurality of dynamic brake means each connected to corresponding one of said second group of switch means through corresponding one of said fifth group of switch means, at the junction portion between the second switch means and the feeder means connected thereto.

6. A feeding system according to claim 1 further comprising:
    a fifth group of switch means; and
    a plurality of dynamic brake means each connected to corresponding one of said second group of switch means through the corresponding one of said fifth group of switch means, at the joint portion between the second switch means and the feeder means connected thereto.

7. A feeding system according to claim 2, 3, 4, 5 or 6 further comprising:
    operation control means being operative such that when a power supply station belonging to at least one of said feeding sections is down, the corresponding ones of said second group of switch means for coupling said down power supply station to the two feeder means for feeding the respective tow linear motor blocks in said one feeding section are opened and the corresponding ones of said third group of switch means respectively connected to the two feeder means of said one feeding section are closed, so that the two linear motor blocks in said one feeding section are respectively fed by power converters respectively belonging to two feeding sections adjacent to said one feeding section through said closed ones of said third group of switch means, said power converters forming a part of said power supply stations associated with said two adjacent feeding sections.

8. A feeding system according to claim 4, 5 or 6 further comprising:
    operation control means being operative such that when two vehicles are present in adjacent two linear motor blocks belonging to one and the same feeding section, the succeeding one of said two vehicles is operated in a dynamic braking mode by the dynamic brake means associated with the linear motor block in which said succeeding vehicle is present, and when two vehicles are present in adjacent two linear motor blocks respectively belonging to adjacent two different feeding sections the succeeding vehicle is operated in a regenerative braking mode by the power supply station associated with the linear motor block in which said succeeding vehicle is present.

9. A feeding system according to claim 5 or 6 further comprising means for controlling each of said second group of switch means and the corresponding one of said fifth group of switch means connected thereto such that said fifth group of switch means is closed while said second group of switch means is opened when dynamic braking is to be effected.

10. A feeding system according to claim 1, 2, 3, 4, 5 or 6 wherein the length $L_{LM}$ of each of the two linear motor blocks in each of said feeding sections is selected to satisfy an inequality formula $$L_{LM} < \tfrac{1}{2}(L_{TT} - L_T)$$

where $L_{TT}$ is a vehicle-to-vehicle distance and $L_T$ is a length of one vehicle.

11. A feeding system according to claim 1, 2, 3, 4, 5 or 6 further comprising:
means for controlling the operation of the vehicles such that a vehicle-to-vehicle distance $L_{TT}$ satisfies an inequality formula $$L_{TT} > 2L_{LM} + L_T$$

where $L_{LM}$ is a length of each of said two linear motor blocks in each of said feeding sections, and $L_T$ is a length of one vehicle.

12. A feeding system according to claim 1, 2, 3, 4, 5 or 6 further comprising:
means for controlling the operation of the vehicles such that each of said linear motor blocks is determined as a block section for the operation of the vehicles.

13. A feeding system according to claim 1, 2, 3, 4, 5 or 6 wherein each of said two feeder means for respectively feeding the two linear motor blocks in each of said feeding sections includes a plurality of feeders; wherein each of the linear motor units belonging to each of said linear motor blocks are alternately connected to the feeders of the feeder means associated with the linear motor block through corresponding one of said first group of switch means; said power supply station includes a plural number of power converters arranged in each of said feeding sections, said plural number being the same as the number of the feeders in each of said two feeder means; and wherein each of said second group of switch means has the same plural number of paths as the number of the feeders of each of the feeder means so that the feeders of each of said feeder means are connected to corresponding one of said plurality of power converters in each of said feeding sections correspondingly through the paths of associated one of said second group of switch means.

14. A feeding system according to claim 13 wherein said means for producing position information includes means for producing position information for each vehicle regarding a specific linear motor block in a specific feeding section in which block the vehicle is present.

15. A feeding system according to claim 13 wherein each of the two linear motor blocks in each of the feeding sections is subdivided into a plurality of zones, and wherein said means for producing position information includes means for producing position information for each vehicle regarding a specific zone in a specific linear motor block in a specific feeding section in which zone the vehicle is present.

16. A feeding system according to claim 1, 2, 3, 4, 5 or 6 further comprising:
means for producing position information regarding positions of the vehicles; and
means responsive to the vehicle position information and based on a stored program for controlling the operations of the respective switch means and the energization, standing-by and deenergization of the respective power supply stations to control the operation of the vehicles.

17. A feeding system for a linear motor transportation system having a number of discrete drive coil units or linear motor units arranged along a track to generate a moving magnetic field for driving vehicles, said feeding system comprising:
a number of feeding sections contiguously extending along said track, said linear motor units being assigned to said feeding sections;
at least one power supply station arranged at each of said feeding sections;
each of said feeding sections being divided into at least two linear motor blocks;
two feeder means respectively arranged for said at least two linear motor blocks in each of said feeding sections;
a first group of switch means, each of the linear motor units belonging to one of said two linear motor blocks of each of said feeding sections being connected to the associated one of said two feeder means through a corresponding one of said first group of switch means, and each of the linear motor units belonging to the other of said two linear motor blocks being connected to the other of said two feeder means through a corresponding one of said first group of switch means;
a second group of switch means, each of said two feeder means arranged in each of said feeding sections being connected to the associated power supply station through corresponding ones of said second group of switch means; and
a third group of switch means, each adjacent two of said feeder means respectively belonging to adjacent different feeding sections being interconnected through corresponding one of said third group of switch means.

18. A feeding system according to claim 17 further comprising:
a fourth group of switch means, each of said second group of switch means being connected to the associated power supply station through corresponding one of said fourth group of switch means.

19. A feeding system according to claim 18 further comprising:
a fifth group of switch means, and
a plurality of dynamic brake means each connected to corresponding one of said fourth group of switch means through corresponding one of said fifth group of switch means, at the junction portion between the fourth switch means and the second switch means connected thereto.

20. A feeding system according to claim 17 further comprising:
a fifth group of switch means, and
a plurality of dynamic brake means each connected to corresponding one of said second group of switch means through corresponding one of said fifth group of switch means, at the junction portion between the second switch means and the feeder means connected thereto.

21. A feeding system according to claim 19 or 20 further comprising:
operation control means being operative such that when two vehicles are present in adjacent two linear motor blocks belonging to one and the same feeding section, the succeeding one of said two vehicles is operated in a dynamic braking mode by the dynamic brake means associated with the linear motor block in which said succeeding vehicle is present, and when two vehicles are present in adjacent two linear motor blocks respectively belonging to adjacent two different feeding sections the succeeding vehicle is operated in a regenerative braking mode by the power supply station associated with the linear motor block in which said succeeding vehicle is present.

22. A feeding system according to claim 20 further comprising means for controlling each of said second group of switch means and the corresponding one of said fifth group of switch means connected thereto such that said fifth group of switch means is closed while said second group of switch means is opened when dynamic braking is to be effected.

23. A feeding system according to claim 17, 18, 19 or 20 further comprising:
operation control means being operative such that when a power supply station belonging to at least one of said feeding sections is down, the corresponding ones of said second group of switch means for coupling said down power supply station to the two feeder means for feeding the respective two linear motor blocks in said one feeding section are opened and the corresponding ones of said third group of switch means respectively connected to the two feeder means of said one feeding section are closed, so that the two linear motor blocks in said one feeding section are respectively fed by power converters respectively belonging to two feeding sections adjacent to said one feeding section through said closed ones of said third group of switch means, said power converters forming a part of said power supply stations associated with said two adjacent feeding sections.

24. A feeding system for a linear motor transportation system having a number of discrete drive coil units or linear motor units arranged along a track to generate a moving magnetic field for driving vehicles, said feeding system comprising:
a number of feeding sections contiguously extending along said track, said linear motor units being assigned to said feeding sections;
at least one power supply station arranged at each of said feeding sections;
each of said feeding sections being divided into at least two linear motor blocks;
two feeder means respectively arranged for said at least two linear motor blocks in each of said feeding sections;
a first group of switch means, each of the linear motor units belonging to one of said two linear motor blocks of each of said feeding sections being connected to the associated one of said two feeder means through a corresponding one of said first group of switch means, and each of the linear motor units belonging to the other of said two linear motor blocks being connected to the other of said two feeder means through a corresponding one of said first group of switch means;
a second group of switch means, each of said two feeder means arranged in each of said feeding sections being connected to the associated power supply station through corresponding ones of said second group of switch means; and
a fourth group of switch means, each of said second group of switch means being connected to the associated power supply station through a corresponding one of said fourth group of switch means.

25. A feeding system according to claim 24 further comprising:
a fifth group of switch means; and
a plurality of dynamic brake means each connected to corresponding one of said fourth group of switch means through corresponding one of said fifth group of switch means, at the junction portion between the fourth switch means and the second switch means connected thereto.

26. A feeding system according to claim 17, 18, 19, 20, 24 or 25 wherein the length $L_{LM}$ of each of the two linear motor blocks in each of said feeding sections is selected to satisfy an inequality formula $$L_{LM} < \tfrac{1}{2}(L_{TT} - L_T)$$

where $L_{TT}$ is a vehicle-to-vehicle distance and $L_T$ is a length of one vehicle.

27. A feeding system according to claim 17, 18, 19, 20, 24 or 25 further comprising:
means for controlling the operation of the vehicles such that a vehicle-to-vehicle distance $L_{TT}$ satisfies an inequality formula $$L_{TT} > 2\, L_{LM} + L_T$$

where $L_{LM}$ is a length of each of said two linear motor blocks in each of said feeding sections, and $L_T$ is a length of one vehicle.

28. A feeding system according to claim 17, 18, 19, 20, 24 or 25 further comprising:
means for controlling the operation of the vehicles such that one of said linear motor blocks constitutes one block section for the operation of the vehicles.

29. A feeding system according to claim 17, 18, 19, 20, 24 or 25 wherein each of said two feeder means for respectively feeding the two linear motor blocks in each of said feeding sections includes a plurality of feeders; wherein each of the linear motor units belonging to each of said linear motor blocks are alternately connected to the feeders of the feeder means associated with the linear motor block through corresponding one of said first group of switch means; said power supply station includes a plural number of power converters arranged in each of said feeding sections, said plural number being the same as the number of the feeders in each of said two feeder means; and wherein each of said second group of switch means has the same plural number of paths as the number of the feeders of each of the feeder means so that the feeders of each of said feeder means are connected to corresponding one of said plurality of power converters in each of said feeding sections correspondingly through the paths of associated one of said second group of switch means.

30. A feeding system according to claim 17, 18, 19, 20, 24 or 25 further comprising;
means for producing position information regarding positions of the vehicles; and
means responsive to the vehicle position information and based on a stored program for controlling the operations of the respective switch means and the energization, standing-by and deenergization of the respective power supply station to control the operation of the vehicles.

31. A feeding system according to claim 30 wherein said means for producing position information includes means for producing position information for each vehicle regarding a specific linear motor block in a specific feeding section in which block the vehicle is present.

32. A feeding system according to claim 30 wherein each of the two linear motor blocks in each of the feeding sections is subdivided into a plurality of zones, and wherein said means for producing position information includes means for producing position information for each vehicle regarding a specific zone in a specific linear motor block in a specific feeding section in which zone the vehicle is present.

* * * * *